US007467043B1

(12) United States Patent
Estupinan

(10) Patent No.: US 7,467,043 B1
(45) Date of Patent: Dec. 16, 2008

(54) METHOD FOR DETERMINING CURRENT SYNTHETIC ULTRAVIOLET INDEX FOR A SPECIFIED LOCATION

(75) Inventor: Jeral Garcia Estupinan, Atlanta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 0 days.

(21) Appl. No.: 11/432,649

(22) Filed: May 10, 2006

Related U.S. Application Data

(60) Provisional application No. 60/679,474, filed on May 10, 2005.

(51) Int. Cl.
*G01W 1/00* (2006.01)
(52) U.S. Cl. .......................................................... 702/3
(58) Field of Classification Search ........................ 702/3
See application file for complete search history.

(56) References Cited

U.S. PATENT DOCUMENTS

| | | | |
|---|---|---|---|
| 5,406,481 A | 4/1995 | Shinozawa et al. | 364/420 |
| 5,440,483 A | 8/1995 | Badoche-Jacquet et al. | 364/420 |
| 5,717,589 A | 2/1998 | Thompson et al. | 364/420 |
| 5,796,611 A | 8/1998 | Ochiai et al. | 364/420 |
| 5,940,776 A * | 8/1999 | Baron et al. | 702/4 |
| 5,974,360 A | 10/1999 | Otsuka et al. | 702/3 |
| 6,023,223 A * | 2/2000 | Baxter, Jr. | 340/531 |
| 6,128,578 A | 10/2000 | Sakaino et al. | 702/3 |
| 6,278,947 B1 | 8/2001 | Baron et al. | 702/3 |
| 6,484,932 B1 * | 11/2002 | Kinney et al. | 235/73 |
| 6,535,817 B1 | 3/2003 | Krishnamurti | 702/3 |
| 6,542,825 B2 | 4/2003 | Jones et al. | 702/3 |
| 6,581,009 B1 | 6/2003 | Smith | 702/3 |
| 6,801,856 B2 | 10/2004 | Ohba et al. | 702/3 |
| 6,836,730 B2 * | 12/2004 | Root et al. | 702/3 |

(Continued)

OTHER PUBLICATIONS

William R. Burrows, CART Regression models for predicting UV Radiation at the Ground in the presence of cloud and other environmental factors, May 1997, American meteorological society, journal of Applied Meteorology, vol. 36, pp. 531-544.*

(Continued)

*Primary Examiner*—John E. Barlow, Jr.
*Assistant Examiner*—Aditya S Bhat
(74) *Attorney, Agent, or Firm*—Woodcock Washburn LLP

(57) ABSTRACT

A current synthetic UV index is developed and successfully verified against direct surface measurements of UV index values. The purpose of this invention is to distribute this current synthetic UV index through cell phones nationwide. This will inform cell phone users for the first time about the current UV index value when they carry their cell phones. The current UV index will be calculated using the geographical location of the cell phone, the time of the day, and the cloud cover conditions in that area. The algorithm will then use this information to calculate the solar elevation needed to determine the amount of UV radiation reaching the earth's surface at any given time. The total column ozone for that particular day will be taken into account for each calculation. This mechanism of dissemination of the actual/current UV index values will be an important achievement with the intention of raising the public's awareness of the harmful effects of the sun's ultraviolet rays.

25 Claims, 44 Drawing Sheets
(19 of 44 Drawing Sheet(s) Filed in Color)

U.S. PATENT DOCUMENTS

| | | | |
|---|---|---|---|
| 6,920,233 | B2 | 7/2005 | Wolfson et al. ............. 382/100 |
| 6,985,837 | B2 | 1/2006 | Moon et al. .................... 703/3 |
| 7,181,345 | B2 * | 2/2007 | Rosenfeld et al. .............. 702/3 |
| 2002/0114517 | A1 | 8/2002 | Wolfson et al. ............. 382/181 |
| 2003/0004780 | A1 | 1/2003 | Smith et al. ................... 705/10 |
| 2003/0151591 | A1 | 8/2003 | Harpen et al. ............... 345/156 |
| 2003/0156734 | A1 | 8/2003 | Wolfson et al. ............. 382/100 |
| 2004/0043760 | A1 | 3/2004 | Rosenfeld et al. ........ 455/414.3 |
| 2004/0162675 | A1 | 8/2004 | Moon et al. .................... 702/3 |
| 2004/0239550 | A1 | 12/2004 | Daly, Jr. ...................... 342/26 |
| 2007/0041702 | A1 * | 2/2007 | Hwang ....................... 385/147 |

OTHER PUBLICATIONS

John E. Fredrick & Carynelisa Erlick, The attentuation of Sunlight by high-latitude clouds;Spectral Dependence and its physical Mechinisms, Dec. 15, 1997, Journal of Atmospheric sciences, vol. 54, pp. 2813-2819.*

Jos van Geffen et al., Surface Radiation monitoring Based on Gome and Sciamachy (10 pages), Apr. 2005.*

Doviac, et al., "Single-Parameter Measurement to Estimate the Rainfall Rate", *Doppler Radar and Weather Observations*, 1993, 8.4-8.4.2, pp. 198-203.

Kerr, J.B. et al., Surface Ultraviolet Radiation: Past and Future, Chapter 5, 5.1-5.46.

Rasmussen, R.M. et al., "The Estimation of Snowfall Rate Using Visibility", *Journal of Applied Meteorology*, 1999, 38, 1542-1563.

Bigelow, D.S. et al., "The UDSA Ultraviolet Radiation Monitoring Program", *Bulletin of the American Meteorological Society*, 1998, 79, 601-615.

Cutchis, P., "A Formula for Comparing Annual Damaging ultraviolet (DUV) Radiation Doses at Tropical and Mid-Latitude Sites", *Federal Aviation Administration Report FAA-EE 80-81*, U.S. Department of Transportation, Washington, DC, Jun. 1980, 65 pages.

Lemus-Deschamps, L.L et al., "The Operational Australian Ultraviolet Index Forecast", *Meteorol. Appl.*, 1997, 6, 241-151, 1999.

Bais, A.F. et al., "Spectral Measurement of Solar UVB Radiation and its Relations to Total Ozone, SO2, and Clouds", *Journal of Geophysical Research*, 1993, 98(D3), 5199-5204.

Ilyas, M., "Effect of Cloudiness on Solar Ultraviolet Radiation Reaching the Surface", *Atmospheric Environment*, 1987, 21(6), 1483-1484.

Long, C.S. et al., "Ultraviolet Index Forecasts issued by the National Weather Service", *Bull. Amer. Meteorol. Soc.*, 1996, 77, 729-748 (17 pages).

Peak, M.J. et al., "Ultraviolet Action Spectra for DNA Diner Induction, Lethality and Mutagenesis in *Escherichia coli* with Emphasis on the UV-B Region", *Photochem. Photobiol.*, 1984, 40(5), 613-620.

Sabburg, J. et al., "Comparasiona of Corrected Daily Integrated Erythemal UVR Data from the U.S. EPZ/UGA Network of Brewer Spectroradiometers with Model and TOMS-Inferred Data", *Journal of Geophysical Research*, 2002, 107(23), 5-1 thru 5-10.

Setlow, R.B., "The Wavelengths in Sunlight Effective in Producing Skin Cancer: A Theoretical Analysis", *Proc. Natl. Academ. Sci.*, 1974, 71(9), 3363-3366.

Theodore, B. Acri-St, "Forecasting the UV Index for UFOS: Model Overview and Methodology", ACRI, UFOS/TN/001, Aug. 30, 2000, 18 pages.

* cited by examiner

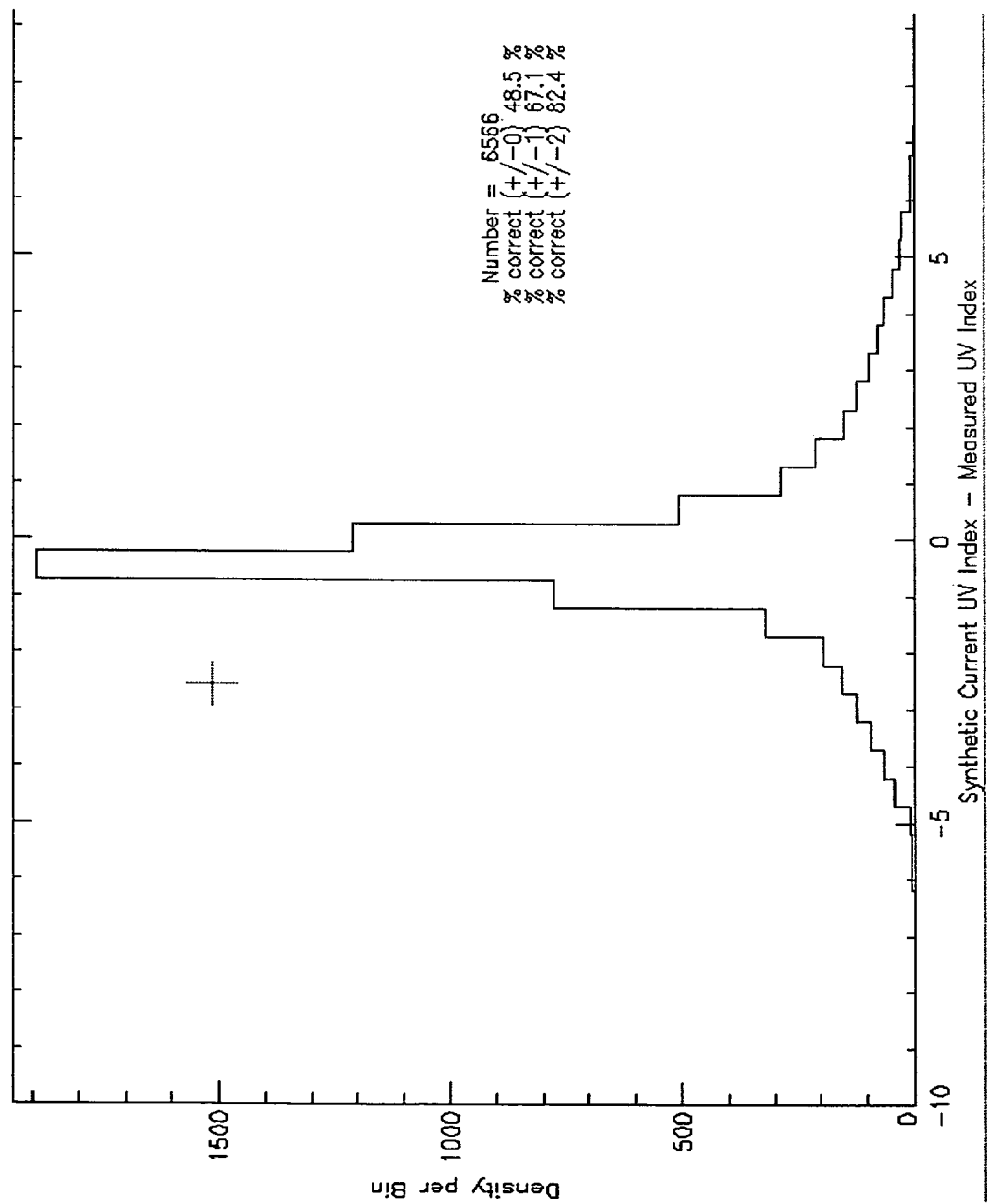

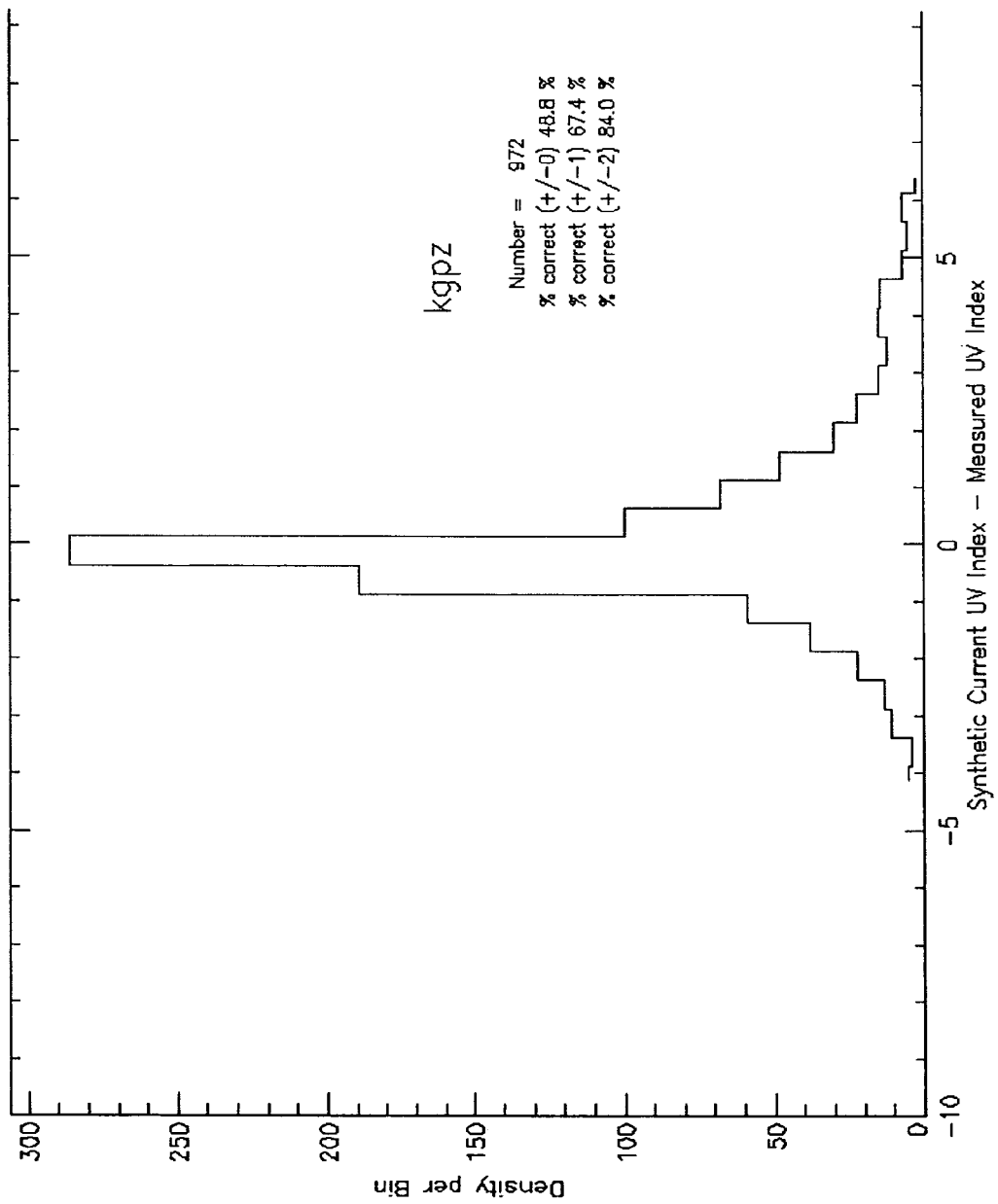

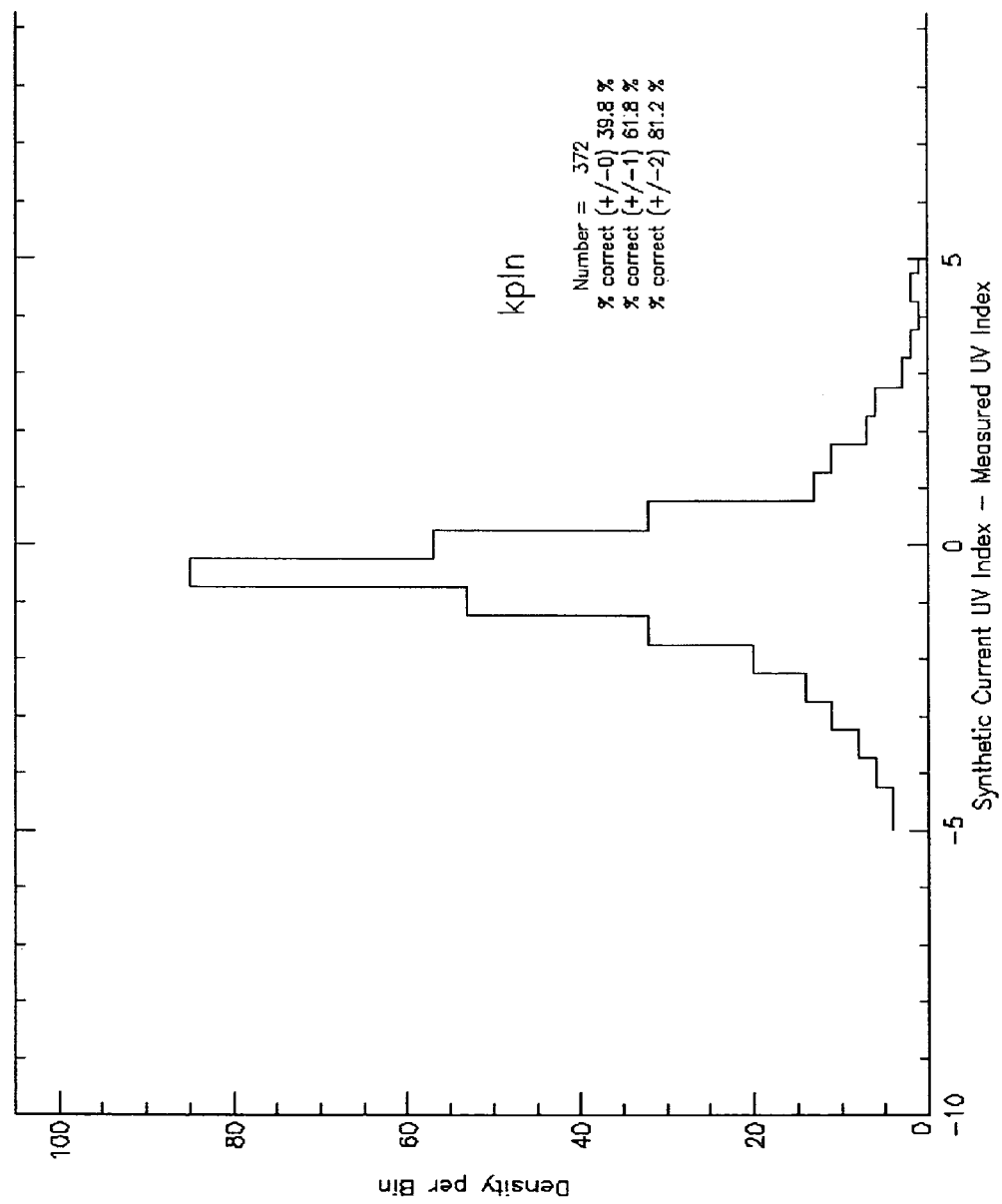

METHOD FOR DETERMINING CURRENT SYNTHETIC ULTRAVIOLET INDEX FOR A SPECIFIED LOCATION

RELATED APPLICATION

The subject matter disclosed herein is related to the subject matter disclosed in provisional U.S. patent application having Ser. No. 60/679,474, filed May 10, 2005, entitled "Method For Determining Synthetic Current Ultraviolet Index Of A Specified Location," which is assigned to the assignee of the present application and hereby incorporated herein by reference in its entirety.

FIELD OF THE INVENTION

This invention relates in general to the field of weather observations. More particularly, this invention relates to a system and method of providing a current synthetic ultraviolet (UV) index for any requested location.

BACKGROUND OF THE INVENTION

The dangers of UV radiation are factual, and public ignorance concerning these matters could lead to increase health problems in the future. One of the most common effects of UV radiation is erythema (or sunburn). Sunburn occurs when skin cells are damaged by UV radiation absorption. To compensate for this damage the skin sends extra blood to the damaged area in an attempt to heal it, which accounts for the skin redness. Long term exposure to UV radiation is linked to many type of skin cancers some of them fatal.

The UV index has been designed as a tool to warn the public of the damaging effects of UV radiation. An effort was started in Australia in the 1980's to report the UV radiation measured the previous day and was aided by a large sun protection campaign. In 1992, Environment Canada began issuing a next day forecast of clear sky UV levels called "UV index." Since then, many other countries, including the United States, have issued UV index forecasts (i.e., a predicted UV level for the next day) in order to increase the people's awareness of the damaging solar UV levels.

To date, however, there is no mechanism to inform the general public of the amount of UV radiation that is being received currently at a specific geographical location (i.e., "right now" at your town or city). Surface UV instruments are available to measure surface UV levels but these instruments are difficult to maintain and their coverage is only limited to specific geographical locations and to a few dozen instruments for a given country. No existing solutions have been proposed to solve these problems.

Therefore, a need exists for the creation of a synthetic UV index to provide current UV index values for all locations, preferably without the need for UV instruments. Also, a need exists for determination of a current synthetic UV index that accounts for the effects of cloud cover, total column ozone of a particular location, and other factors. There also is a need for an approach for determining a current synthetic UV index that expands the number of current UV index observations beyond those locations that are equipped with ground-based UV instruments. Further, systems and methods of determining a current synthetic UV index for a specified location that solve one or more of the disadvantages existing in the prior art while providing other advantages over the prior art would represent an advancement in the art.

SUMMARY OF THE INVENTION

The present invention is directed to systems and methods of determining and distributing a current synthetic ultraviolet (UV) index through electronic devices, e.g., cell phones, PDAs, etc. This will inform users about the current UV index value when they carry their cell phones, PDAs, etc. The current UV index may be calculated using the geographical location of the cell phone, the time of the day, and the cloud cover conditions in that area. An algorithm may then use this information to calculate the solar elevation needed to determine the amount of UV radiation reaching the earth's surface at any given time. More UV observations means that more people living in different areas can benefit from current UV index values and the diurnal variation of these values in reference to their specific location. This will increase the self awareness of people about the conditions (clear, cloudy, time of the day, etc.) that have an effect on the current UV index values.

According to one embodiment of the invention, a method of determining a current synthetic ultraviolet (UV) index value for a given location is disclosed. The method may include the steps of: determining a clear sky UV radiation using a most recent total column ozone available to the given location where the clear sky UV radiation is calculated; adjusting the clear sky UV radiation; determining a cloud adjusted UV radiation; and converting the cloud adjusted UV radiation to UV index units.

In accordance with another aspect of the invention, the method further includes determining the clear sky radiation using a location, elevation, and total column ozone at a given time.

In accordance with another aspect of the invention, the location includes a geographical latitude and longitude.

In accordance with another aspect of the invention, adjusting the clear sky UV radiation further includes using a percentage cloud cover to determine a cloud attenuation factor.

In accordance with another aspect of the invention, the method further includes multiplying the clear sky UV radiation by a cloud attenuation factor to obtain the cloud adjusted UV radiation.

In accordance with another aspect of the invention, the method further includes dividing the cloud adjusted UV radiation in milli-Watts m−2 by 25 to convert to the UV index units.

In accordance with another aspect of the invention, the method further includes providing the UV index to a user device located at the given location.

According to another embodiment of the invention, a method of determining a current synthetic ultraviolet (UV) index value for a given location is disclosed. The method may include: determining a clear sky UV radiation for the given location; determining a cloud adjusted UV radiation; and converting the cloud adjusted UV radiation to UV index units.

In accordance with another aspect of the invention, the method further includes forwarding the UV index units to a remote device.

In accordance with another aspect of the invention, the method further includes interpolating the clear sky UV radiation for the given location from a closest total column ozone available to the given location.

In accordance with another aspect of the invention, the method further includes expanding a number of current synthetic UV index values that may be distributed by a factor greater than about 200 in, for example, the United States.

In accordance with another aspect of the invention, the method further includes verifying the current synthetic UV index value using actual cloud cover reports from specific UV measuring sites.

In accordance with another aspect of the invention, the current synthetic UV index value for the given location correlates within an accuracy of about +/−0 UV index units of a direct surface measured UV index value. In accordance with another aspect of the invention, the current synthetic UV index value for the given location correlates within an accuracy of about +/−1 UV index units of a direct surface measured UV index value. In accordance with another aspect of the invention, the current synthetic UV index value for the given location correlates within an accuracy of about +/−2 UV index units of a direct surface measured UV index value.

According to another embodiment of the invention, a system for providing a current synthetic UV index value for a specified location is provided. The system includes an interface for receiving a request for the current synthetic UV index value for the specified location. The request may include a geographical location of the specified location, and a date and a time of day of the request. The system also includes a database storing data comprising a closest cloud cover condition to the specified location and a closest total column ozone available to the specified location. A server is provided having an algorithm for determining the current synthetic UV index value for the specified location using the geographical location of the specified location, the date and time of day of the request, the closest cloud cover condition to the specified location, and the closest total column ozone available to the specified location. An interface is provided for transmitting the current synthetic UV index value for the specified location.

In one embodiment the algorithm comprises:

$$T_{clouds}=1-0.62*cld$$

wherein cld is the fraction of the sky covered by clouds (0 to 1).

In accordance with another aspect of the invention, the interface further includes one or more of: a wireless network interface, a land-based network interface, an Internet network interface, and/or a satellite network interface.

In accordance with another aspect of the invention, the data further comprises a latitude, a longitude, and an altitude for the geographical location.

In accordance with another aspect of the invention, the data relating to the closest cloud cover condition to the specified location is periodically updated using measurements to account for diurnal and weather system variations of the closest cloud cover condition to the specified location.

In accordance with another aspect of the invention, the current synthetic UV index value for the specified location is transmitted to a user device that generated the request for the current synthetic UV index value for the specified location.

In accordance with another aspect of the invention, a notice regarding current synthetic UV index value for the specified location is generated. Also, a warning regarding potentially harmful effects of the sun's UV rays based on the current synthetic UV index value for the specified location may be generated. In addition, a recommendation regarding steps to be taken to protect against any harmful effects of the sun's UV rays based on the current synthetic UV index value for the specified location may be generated.

Additional features and advantages of the invention will be made apparent from the following detailed description of illustrative embodiments that proceeds with reference to the accompanying drawings.

BRIEF DESCRIPTION OF THE DRAWINGS

The patent or application file contains at least one drawing/photograph executed in color. Copies of this patent or patent application publication with color drawing(s)/photograph(s) will be provided by the Office upon request and payment of the necessary fee.

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 shows a histogram encompassing measured UV index data from the METAR locations;

FIGS. 6a-6m show individual histograms for each of the thirteen METAR stations;

DETAILED DESCRIPTION OF PREFERRED EMBODIMENTS

Figure 1:
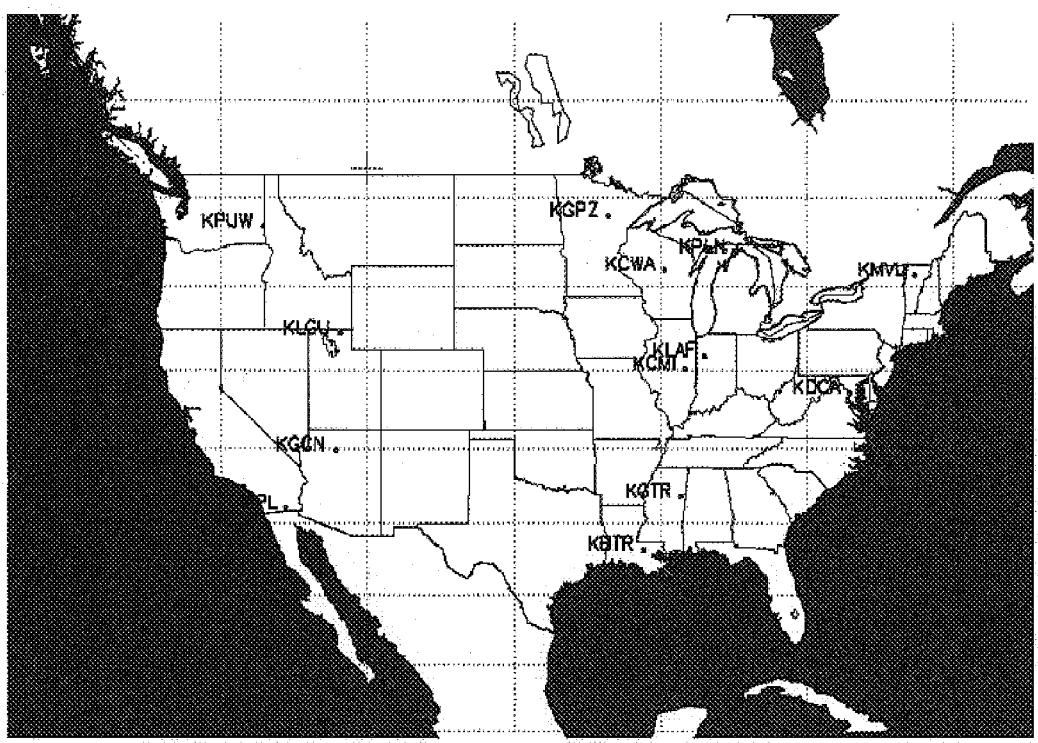
FIG. 1 shows the location of the Meteorological Aeronautical Report (METAR) reporting locations.

The above problems in the prior art have motivated the creation of a current synthetic UV index to provide real time, or substantially real time, UV index values for any specified location. As used herein synthetic means derived from other parameters (i.e., not measured directly using instrumentation). As used herein real time, or substantially real time, means using the most current data/observations that are available. The specified location does not have to include UV instrumentation. As such, this approach expands significantly the number of locations for which current synthetic UV index values may be generated. The systems and methods for determining a current synthetic UV index account for spatial and temporal variations in cloud cover and total column ozone. Other input factors to the calculation of the current synthetic UV index may include: the geographical location (latitude, longitude, altitude, etc.) and time and date of the specified location. These other input factors may generally be accounted for without measurements and can be easily incorporated in the calculation of the current UV index. An algorithm may use this input information to calculate the solar elevation needed to determine the amount of UV radiation reaching a specified location on the earth's surface at any given time.

The systems and methods may also provide for the receipt and distribution of a current synthetic UV index through electronic devices over a geographical region, such as nationwide over the United States. For example, the current synthetic UV index may be calculated using the geographical location of a cell phone used to generate a request or inquiry of a current UV index value for the site at which the cell phone is located, or another cited specified in the request. This feature helps to inform cell phone users for the first time about the current UV index value when they carry their cell phones. The current synthetic UV index may be calculated using the geographical location of the cell phone and the time of the day in a particular area.

At least one embodiment has been successfully verified against direct surface measurements of UV index values. For example, in one exemplary verification process the results were verified against UV index values measured by the United States Department of Agriculture (USDA) for a total of 6566 data points (at 13 different locations across the United States) over a period of a month. In about 50% of these cases, the synthetic UV index was substantially identical to the observed or measured UV index. In about 67% of these cases, the synthetic UV index showed a different of about +/−1 UV index unit from the measured UV index. In about 83% of the cases, the synthetic UV index was within about +/−2 UV index units of the observed UV index.

Presently, current or measured UV indices are strictly limited in coverage to locations where surface values of UV radiation are measured by broadband or spectral UV sensors. This mechanism of dissemination of the actual/current UV index values is an important achievement with the intention of raising the public's awareness of the harmful effects of the sun's ultraviolet rays.

A verification of this exemplary system and method of determining a current synthetic UV index is also illustrated in order to demonstrate its validity as an operational tool capable of providing real time synthetic UV index values for, for example, more than 1200+ cities across the United States. Although this study provides verification results for the calculation of current synthetic UV index values at surface Meteorological Aeronautical Report stations (METARs), it is possible to extend the current UV index calculation for any point. For instance, satellite cloud cover values may be used to obtain the amount of cloud cover at any location. An exemplary methodology employed to derive the synthetic UV index is described in the next section.

Exemplary Methodology and Instrumentation Used to Derive the Current Synthetic UV Index.

Clouds are one of the most important contributors to the variability in surface UV irradiance due to their short time and spatial variability. Although, radiative transfer calculations through clouds are theoretically possible, the input parameters needed by the radiative transfer models are not available. The lack of cloud type, altitude, cloud optical properties (e.g. optical depth) prevent cloud radiative transfer calculations in routine operations. Routine surface observations of cloud cover are limited to fractional cloud cover. This has allowed for direct comparisons between cloud fraction and UV transmission [Bais et al., 1993; Cutchis, 1980; Ilyas, 1987; Josefsson, 1986]. For instance, the National Atmospheric and Oceanic Administration (NOAA) currently compares MOS cloud fractions with measured UV transmission to determine the average UV attenuation of clouds when calculating the forecast UV index [Long et al., 1996].

In one exemplary verification study, a similar approach was followed except that instead of using forecast values of fractional cloud cover the exemplary verification study compared instantaneous values of fractional cloud cover with the UV transmission to derive an empirical relationship to account for the effects of clouds on UV radiation that is valid for the METAR network. The comparison between cloud cover and UV radiation was limited to UV measuring sites from the US Department of Agriculture (USDA) to take advantage of the high frequency used by the USDA UV network to measure erythemal UV radiation (every three minutes). The comparison of the cloud cover from the METAR locations was constrained to USDA UV measuring sites that are within 15 miles of the METAR reporting stations. Thirteen METAR reporting locations were found to meet the distance criteria. Small distances between the UV observing sites and the METAR locations helped to ensure that no additional uncertainties are introduced due to cloud cover differences.

Figure 2:
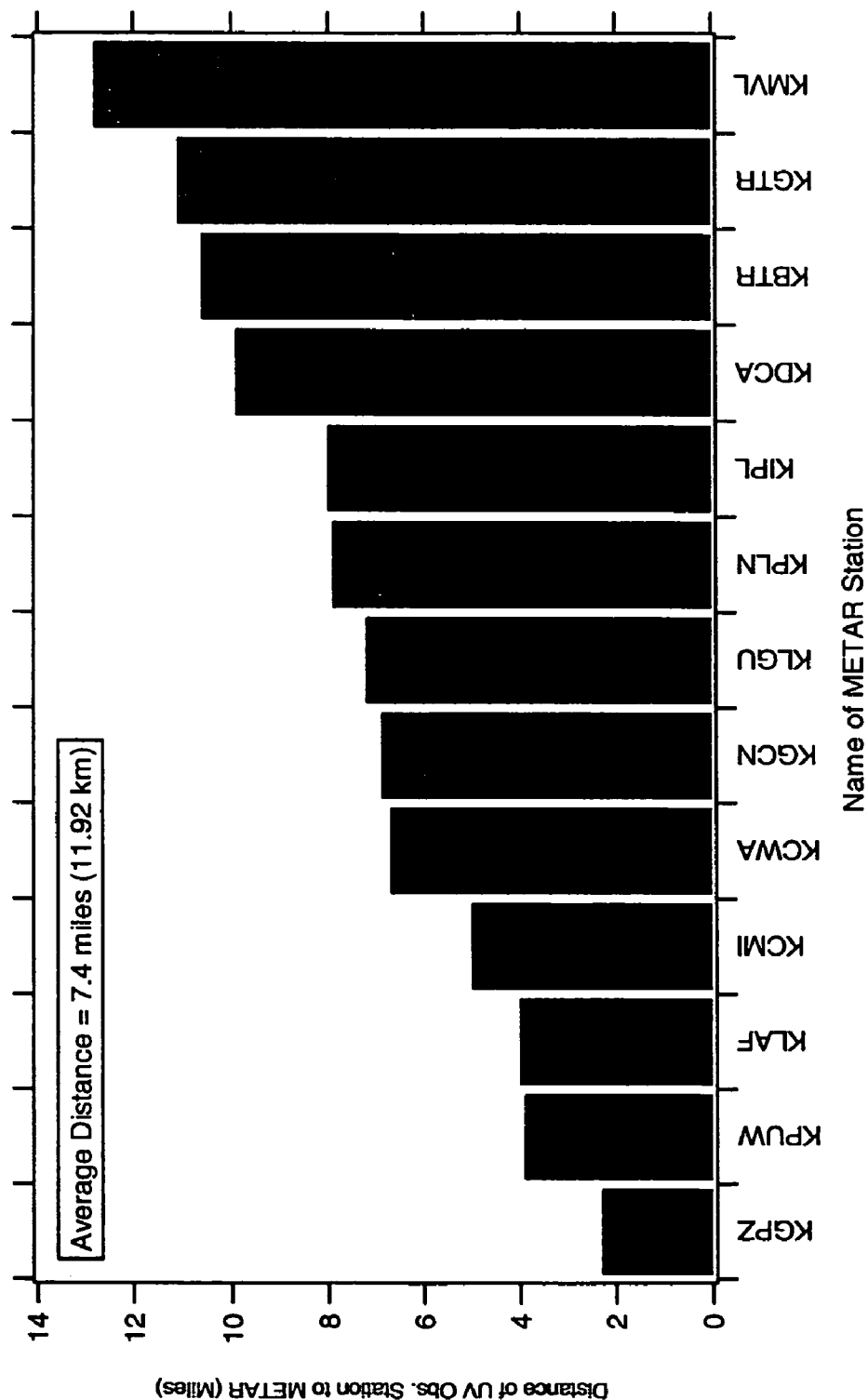
FIG. 2 illustrates the distance between the UV observing sites and the METAR locations for each site.

Table 1 shows the details of these UV measuring sites and the co-located METAR locations. The locations of these 13 sites are shown in FIG. 1. FIG. 2 displays the distance between the UV observing sites and the METAR locations for each site. The average distance between the METAR sites and UV instruments is 7.4 miles. Cloud cover from METAR reports are available once an hour during benign weather and several times an hour when special reports are issued during inclement weather. The METAR cloud reports are converted to percentage cloud cover before they are compared to the closest three minute measured UV radiation from the USDA UV network. Only data for solar elevation angles ranging between 51 and 53 degrees above the horizon are used in the derivation of the cloud relationship. This range of solar angles provided the largest number of observations for the data collected in the exemplary verification study. Also, the two degree range is small enough not to introduce uncertainties related to changes in UV radiation due to changes in solar elevation. The cloud attenuation (or reduction) may be calculated using equation (1).

$$\text{Reduction} = \frac{\text{Value (Clouds)}}{\text{Value (Clear)}} \quad (1)$$

Where:
Value(Clouds)=(−0.859241×PercentClouds)+139.014542
Value(Clear)=139.014542
The correlation coefficient for this relationship is 0.62.

The UV radiation is expressed in reference to the clear sky UV radiation that would have been measured without the presence of clouds or cloud transmission factor ($T_{clouds}$). In a simplified form equation (1) becomes:

$$T_{clouds} = 1 - 0.62 * cld \quad (1)$$

wherein cld is the fraction of the sky covered by clouds (0 to 1).

Figure 3:
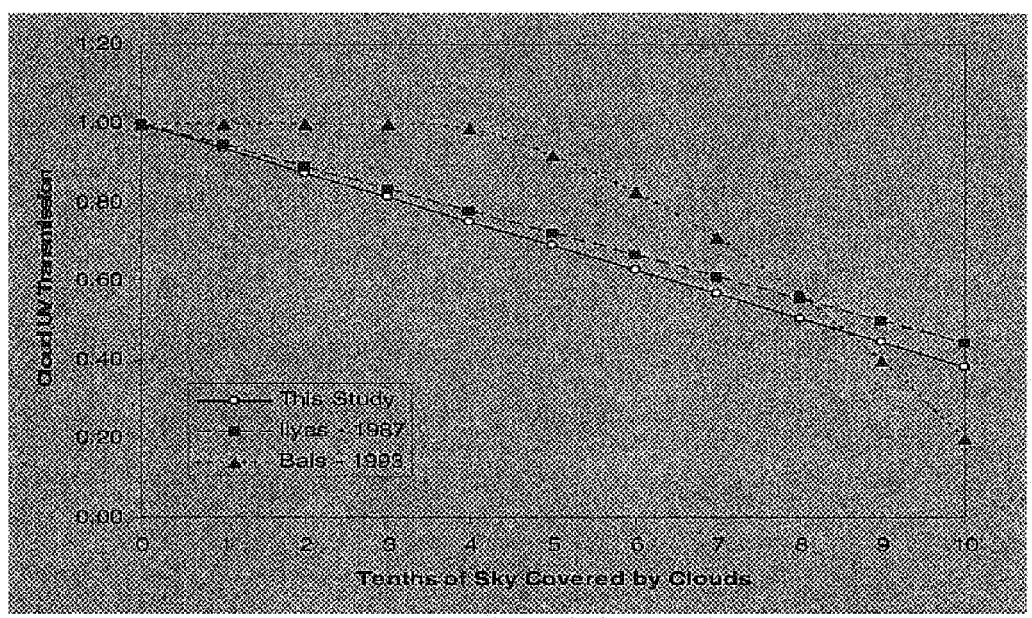
FIG. 3 shows the compares exemplary UV attenuation determined using one embodiment of the present invention to results obtained in previous studies.

FIG. 3 compares the UV attenuation that is calculated using equation (1) with the results obtained by Ilyas (1987) and Bais et al. (1993). The exemplary verification study yields less transmission than the one obtained by Ilyas for all cloud amounts. Bais et al. (1993) yields more transmission when less than 80% of the sky is covered by clouds and less transmission when more than 80% of the sky is covered by clouds.

Once the cloud cover empirical relationship is derived the next step includes verifying the synthetic UV index for all 13 locations. The synthetic UV index is calculated using a clear sky two stream radiative transfer model [Madronich, 1982] for all cloud METAR reports with a solar elevation angle greater than 15 degrees above the horizon. This UV model runs very fast on most computers nowadays and does not limit the concurrent calculation of large number of synthetic UV index values. The calculation may be attained in two steps. First, the clear sky erythemal UV radiation (from 280 to 400 nm) is calculated for all METAR reports at the 13 locations listed in Table 1 using the total column ozone that was measured at the time of the UV measurements by the UV Multi-Filter Shadow band Radiometers (UV-MFSR) present at each of the USDA UV measuring stations. The elevation of each location is considered in the calculation of the clear sky UV index. The altitude adjustment is derived from the radiative transfer model and it corresponds to about 6% for the first kilometer. Then the cloud cover reduction factor from equation 1 is applied to attenuate the clear sky UV radiation. The next step includes calculating the difference between the synthetic UV index and the measured UV index for all records between Jul. 25, 2004 and Aug. 25, 2004. This comparison may be done for all METAR reports that satisfy the criteria of reporting within three minutes of measured UV radiation values from the USDA UV network. The next section describes the results of this exemplary comparison.

TABLE 1

| NAME OF UV LOCATION | LAT OF UV LOC. | LONG. OF UV LOC. | ALTITUDE (M) OF UV LOC. | METAR | NAME OF METAR LOCATION | LAT. OF METAR LOC. | LON. OF METAR LOC. | STATE | ALTITUDE (M) OF METAR LOC. | DISTANCE OF UV TO METAR (MILES) |
|---|---|---|---|---|---|---|---|---|---|---|
| North Central Research and Outreach Center (Grand Rapids) | −93.53 | 47.18 | 394 | KGPZ | Grand Rapids Automatic Weather Observing | 47.22 | −93.52 | MN | 399 | 2.3 |
| Albion Field Station (Pullman) | −117.18 | 46.75 | 804 | KPUW | Pullman/Moscow/ Pullman/ Moscow Region | 46.74 | −117.11 | WA | 778 | 3.9 |
| Agronomy Research Center (West Lafayette) | −86.99 | 40.47 | 216 | KLAF | Lafayette/Purdue University Airport | 40.41 | −86.95 | IN | 185 | 4 |
| Bondville Road Station (Bondville) | −88.36 | 40.04 | 213 | KCMI | Champaign/ Urbana/ University Of Illinois | 40.03 | −88.27 | IL | 230 | 5 |
| Lake Dubay (Dancy) | −89.76 | 44.7 | 381 | KCWA | Mosinee/Central Wisconsin | 44.78 | −89.67 | WI | 388 | 6.7 |
| Abyss Site at Grand Canyon National Park (Flagstaff) | −112.18 | 36.05 | 2073 | KGCN | Grand Canyon National Park | 35.93 | −112.15 | AZ | 2034 | 6.9 |
| Utah Climate Center (Logan) | −111.9 | 41.66 | 1368 | KLGU | Logan/Logan Cache Airport | 41.78 | −111.85 | UT | 1357 | 7.2 |
| University of Michigan Biological Station at Douglas Lake (Pellsto | −84.66 | 45.55 | 238 | KPLN | Pellston/Pellston Regional Airport of Em | 45.57 | −84.8 | MI | 220 | 7.9 |
| Desert Research and Extension Center (Holtville) | −115.44 | 32.8 | −18 | KIPL | Imperial/ Imperial County Airport | 32.83 | −115.58 | CA | −17 | 8 |

TABLE 1-continued

| NAME OF UV LOCATION | LAT OF UV LOC. | LONG. OF UV LOC. | ALTITUDE (M) OF UV LOC. | METAR | NAME OF METAR LOCATION | LAT. OF METAR LOC. | LON. OF METAR LOC. | STATE | ALTITUDE (M) OF METAR LOC. | DISTANCE OF UV TO METAR (MILES) |
|---|---|---|---|---|---|---|---|---|---|---|
| USDA Phytonutrients Lab (Beltsville) | −76.95 | 39.01 | 64 | KDCA | Washington DC/ Reagan National Airport | 38.85 | −77.03 | VA | 5 | 9.9 |
| LSU Central Research Station (Baton Rouge) | −91.16 | 30.35 | 7 | KBTR | Baton Rouge Metropolitan | 30.54 | −91.15 | LA | 21 | 10.6 |
| Mississippi Agricultural and Forestry Experiment Station (Starkvil | −88.78 | 33.46 | 85 | KGTR | Golden Tri AWS | 33.45 | −88.58 | MS | 79 | 11.1 |
| Proctor Maple Research Center (Burlington) | −72.85 | 44.53 | 408 | KMVL | Morrisville/ Morrisville-Stowe State Airp | 44.54 | −72.62 | VT | 223 | 12.8 |

Cloud cover observations reported by METAR stations are for the most part done automatically in the United States. Only one of the 13 exemplary METAR locations used for this study was a manual station (Washington D.C./Reagan National Airport). Automated METAR stations are only capable of reporting clouds below 12,000 feet. This means that middle clouds or high clouds above 12,000 feet are not detected by the automatic stations. When they are present they can attenuate a portion of the UV radiation if the thickness of these middle clouds is significant. In general, only 22% of all METAR stations that report sky conditions in the US are manual, meaning that an observer is present at least for part of the day. In the event that clouds are not detected below 12,000 feet, but are present above 12,000 feet, the synthetic UV index will lead to a small overestimate of the UV radiation. When clouds are not present at all, the synthetic UV index will, for the most part, be calculated with no bias. In order to minimize any uncertainties introduced by the cloud detection of the METAR stations only data corresponding to the summer month (more convective clouds with less large scale fronts containing altostratus, altocumulus, and cirrus clouds) is used in the derivation of the empirical relationship.

Figure 4:
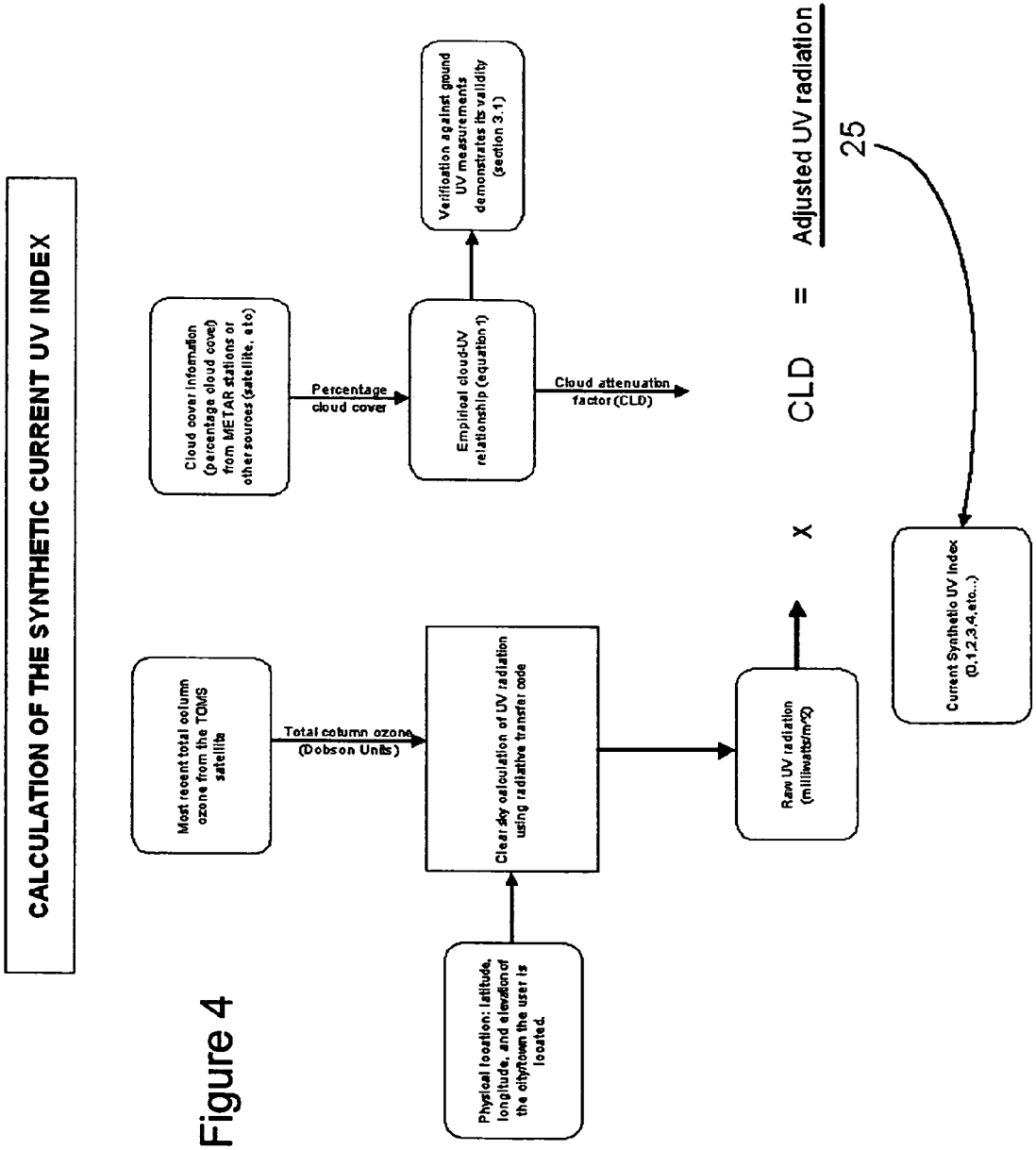
FIG. 4 shows an exemplary logic diagram illustrating an exemplary system and method for calculation and verification of a synthetic UV index.
Figure 6A:
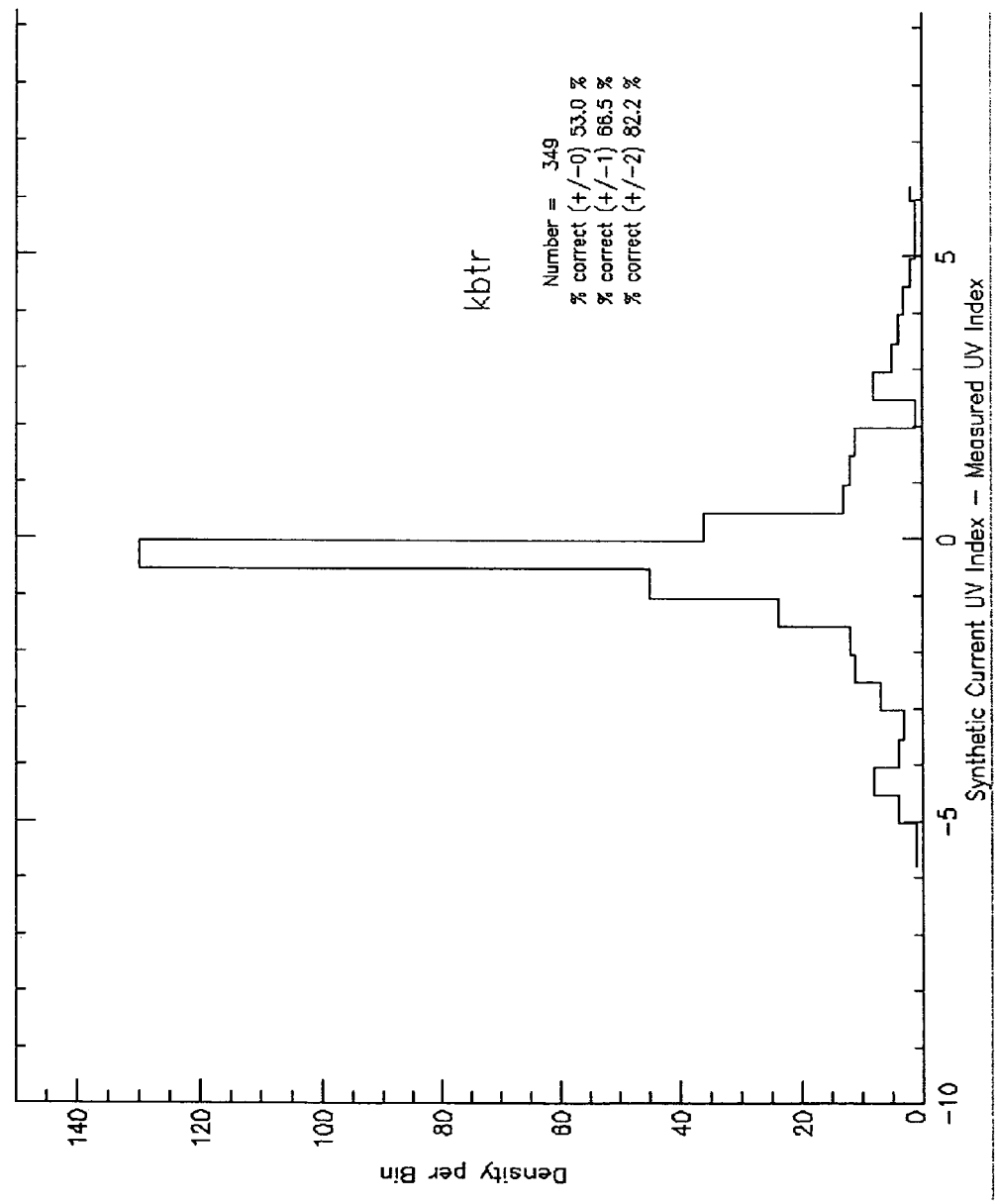
Figure 6B:
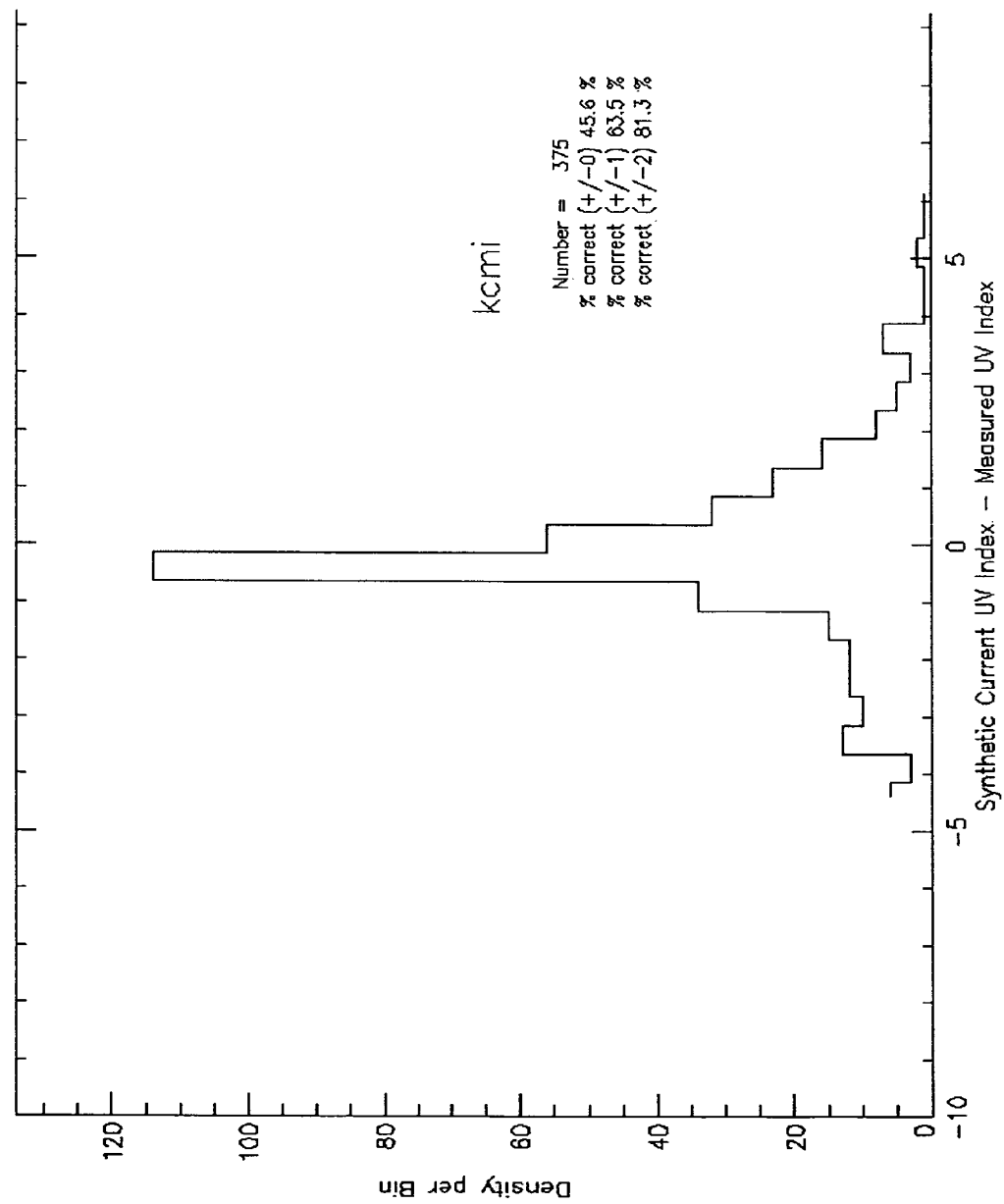
Figure 6C:
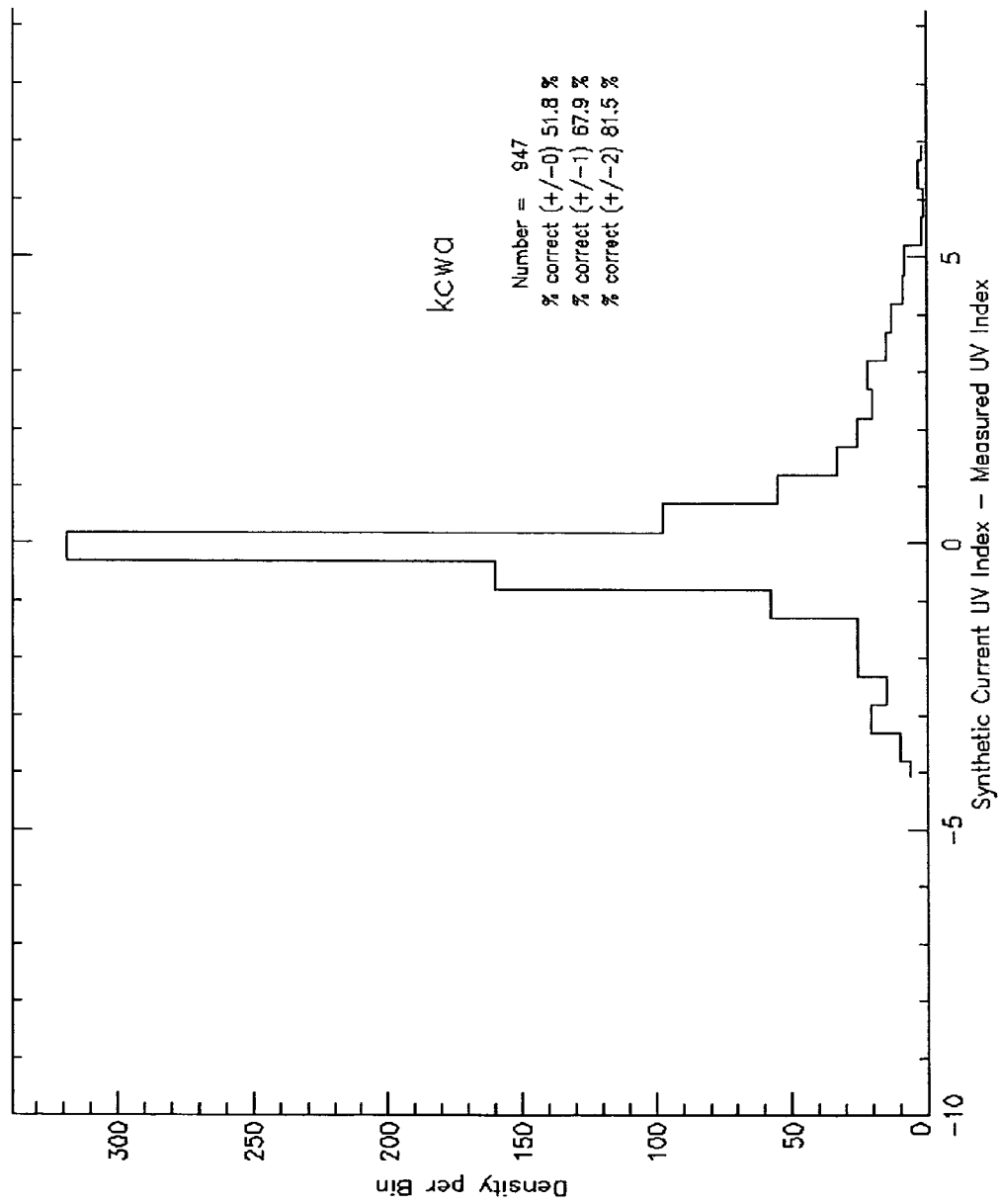
Figure 6D:
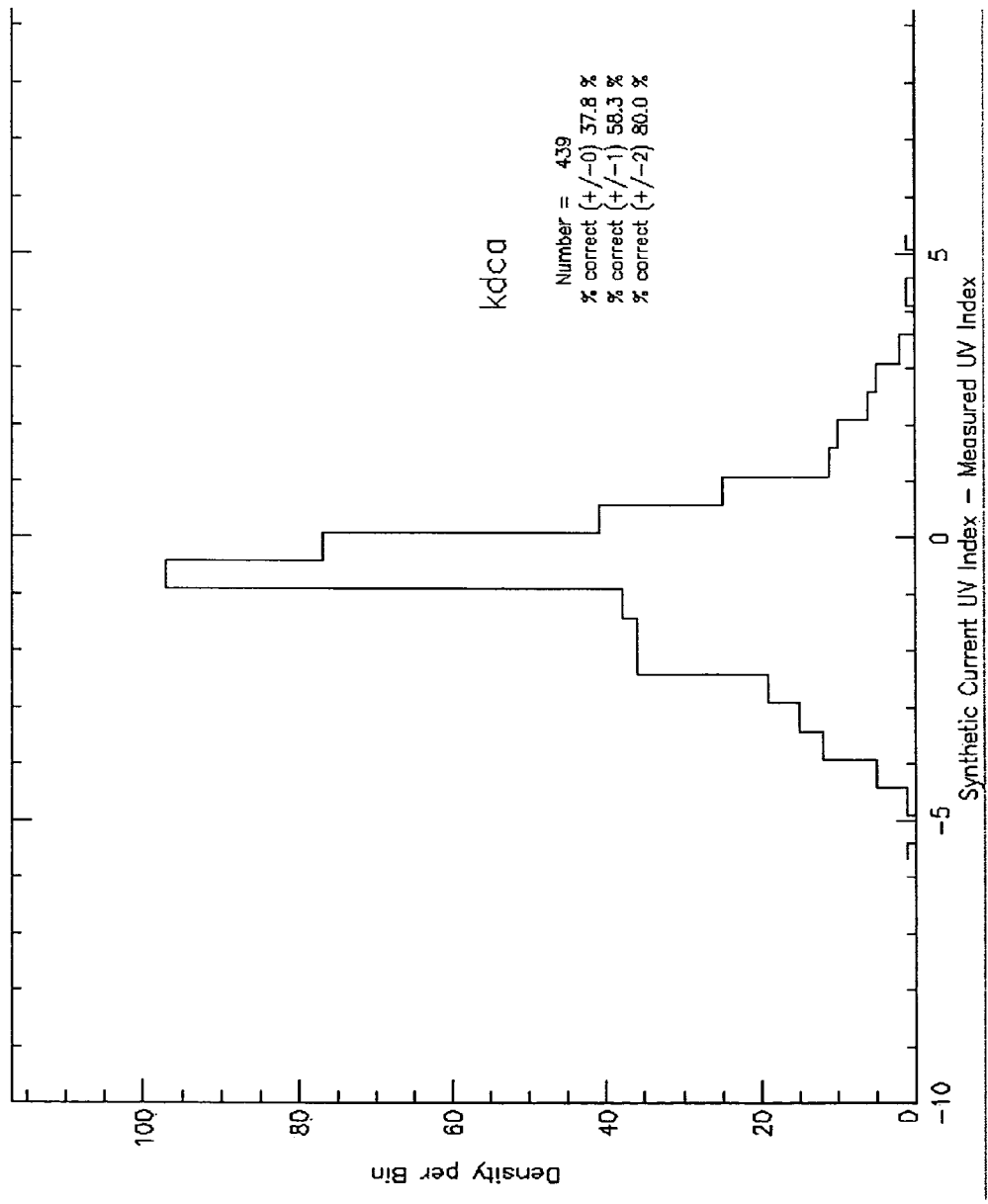
Figure 6E:
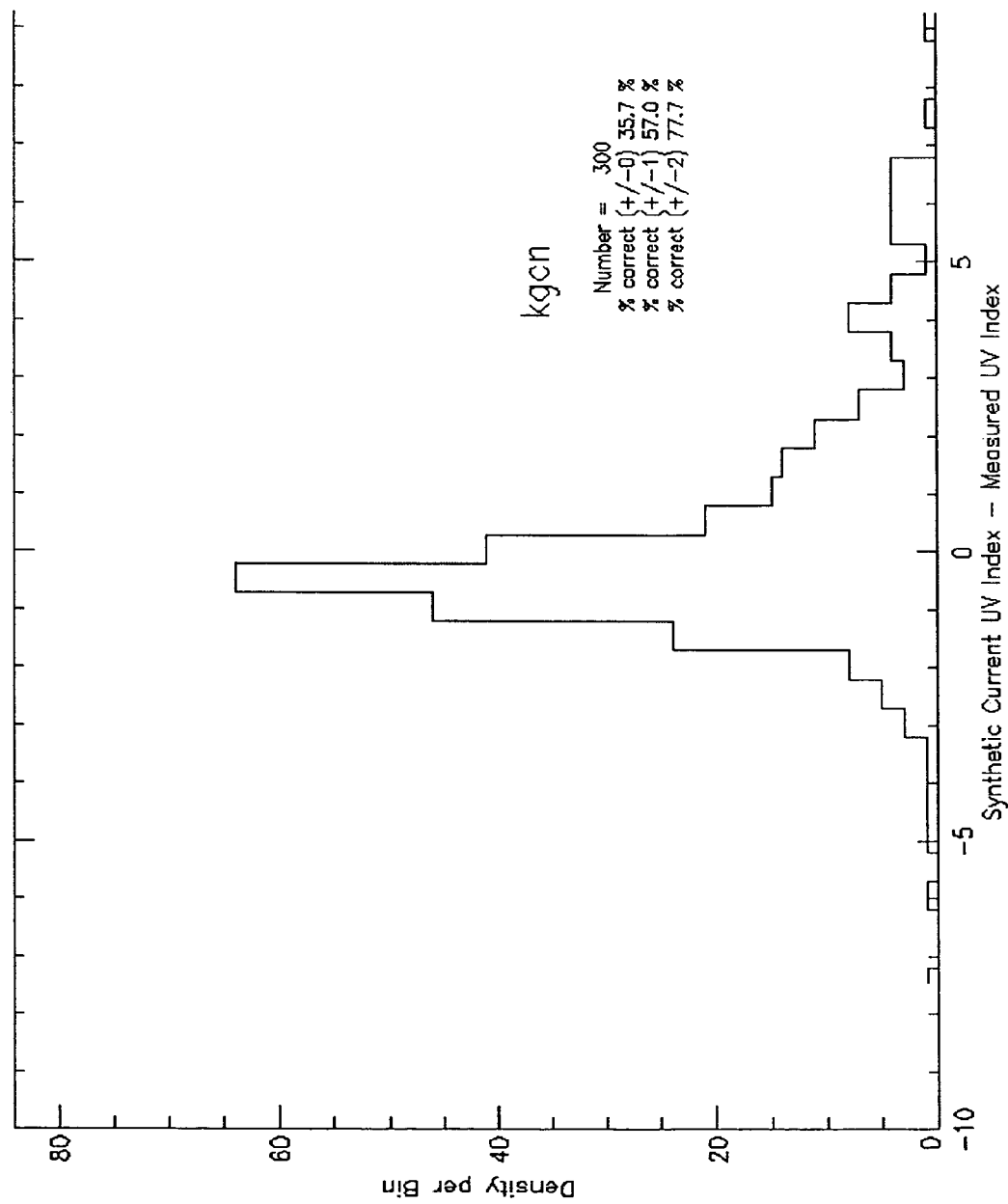
Figure 6G:
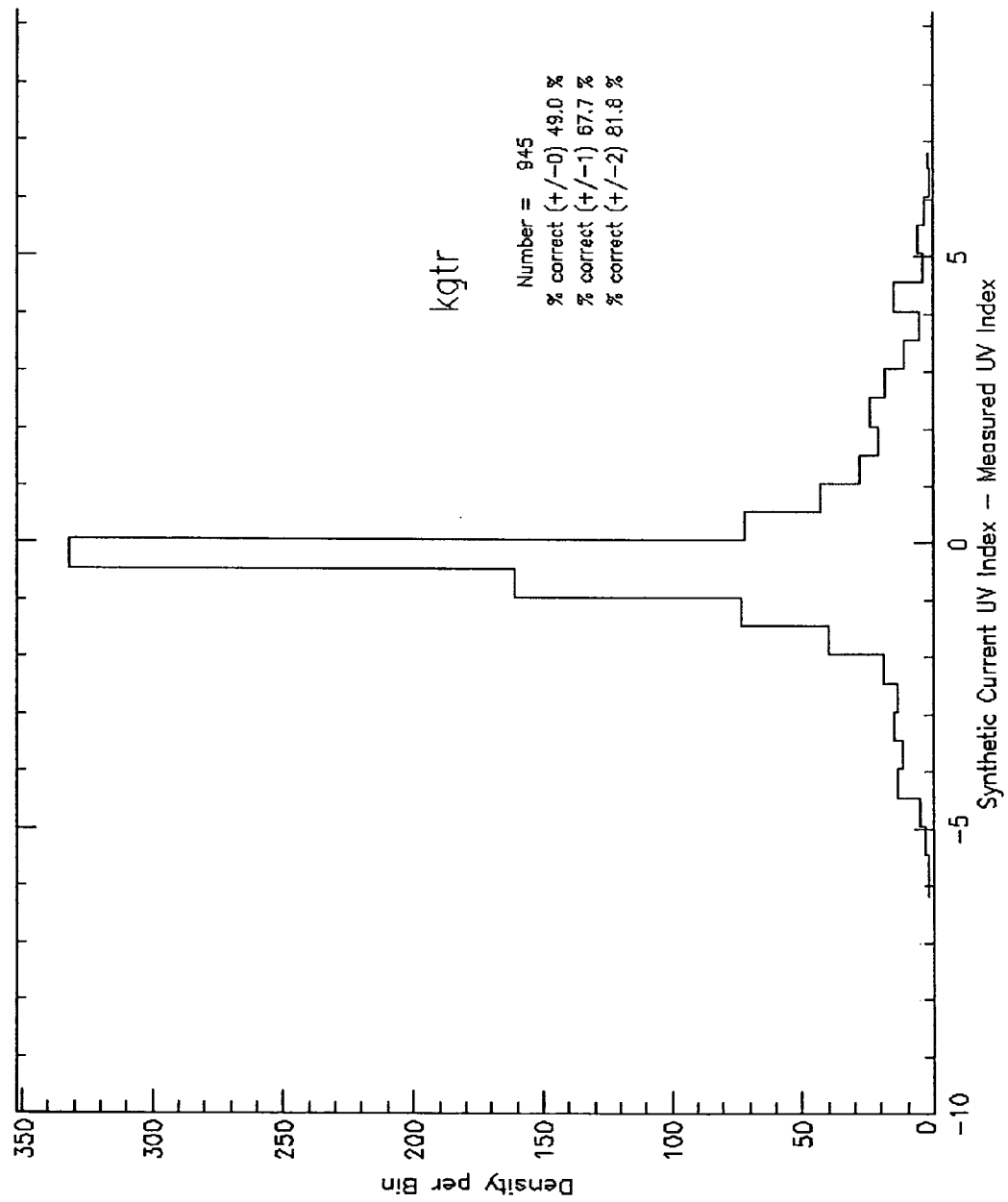
Figure 6H:
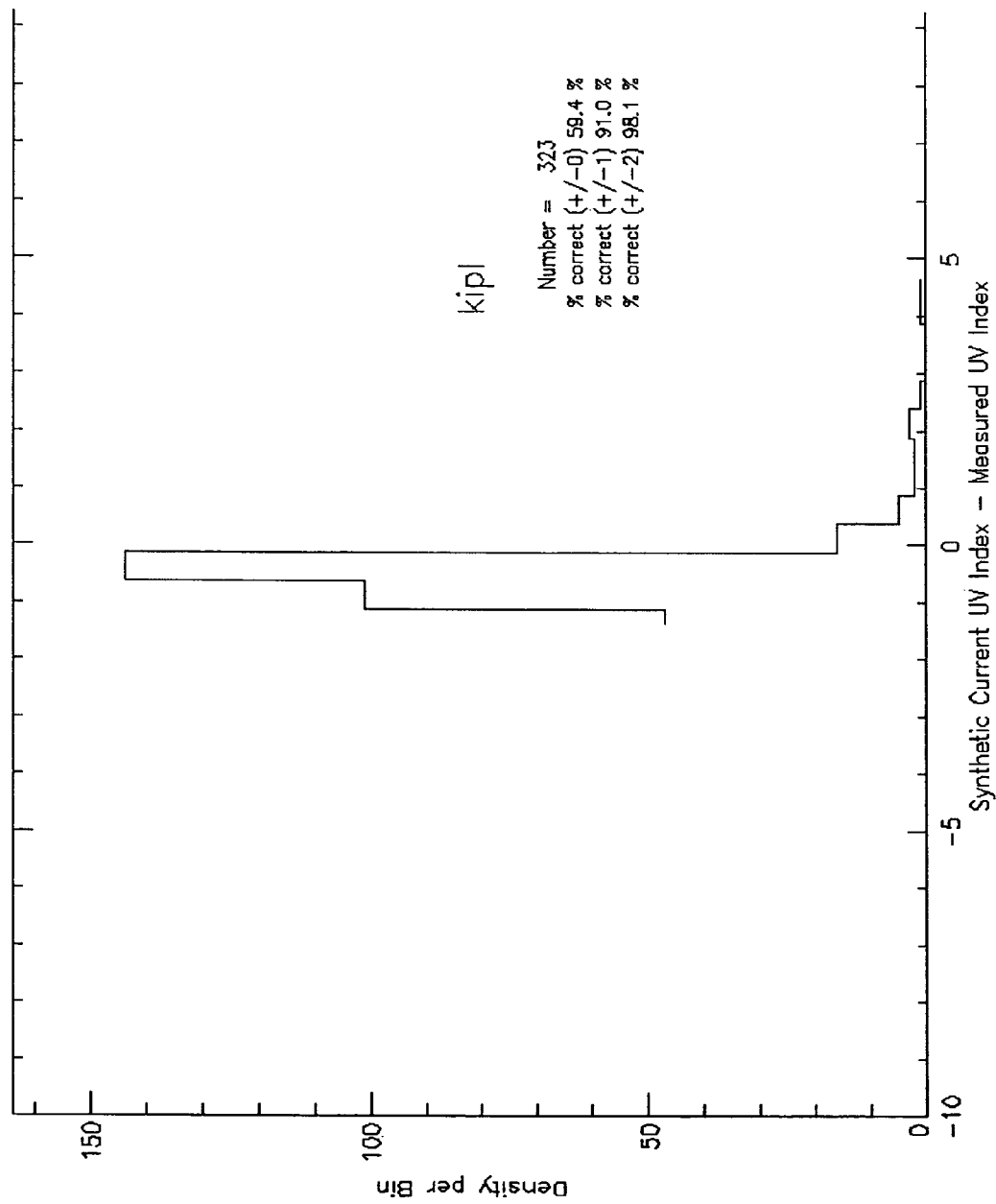
Figure 6I:
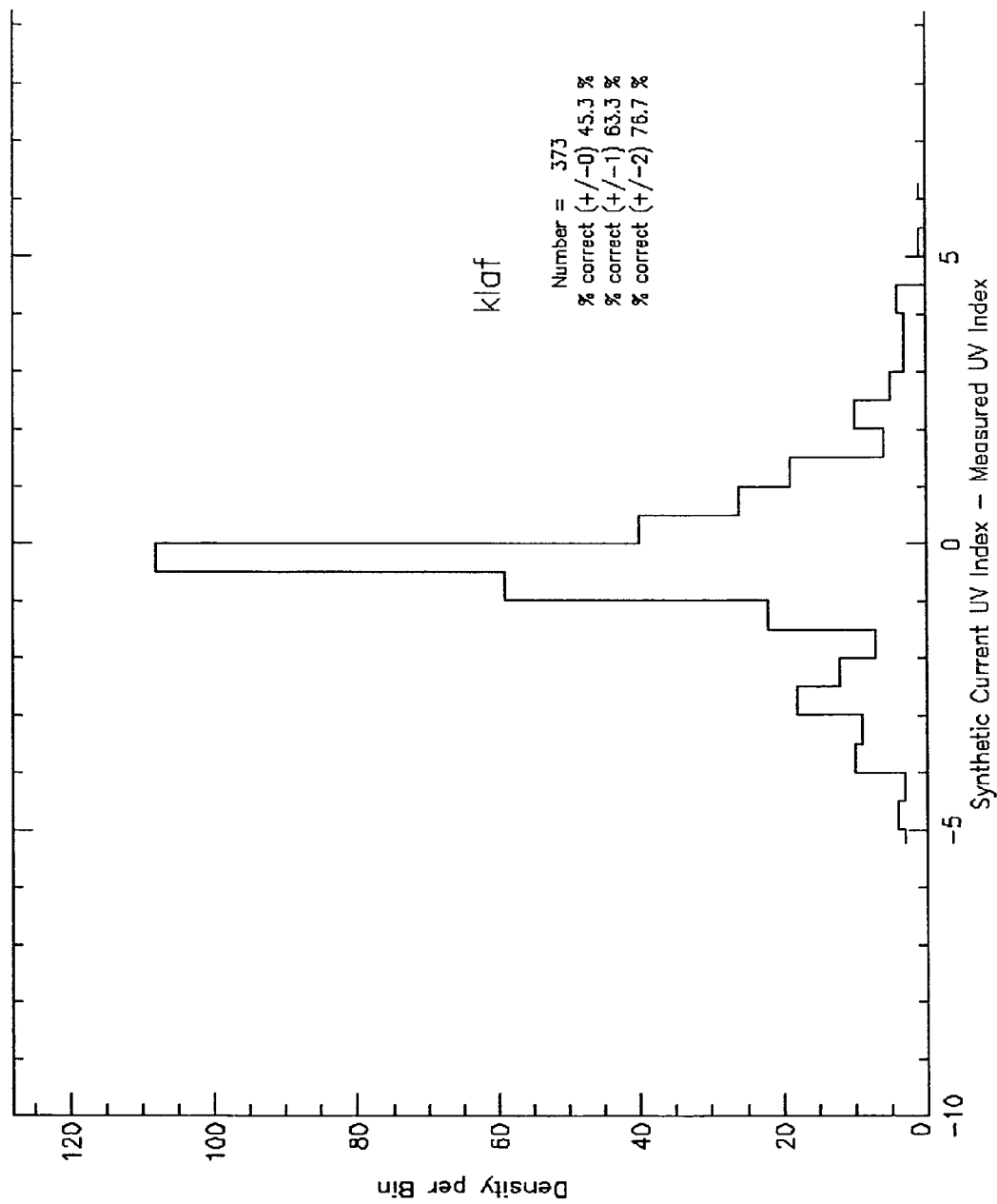
Figure 6J:
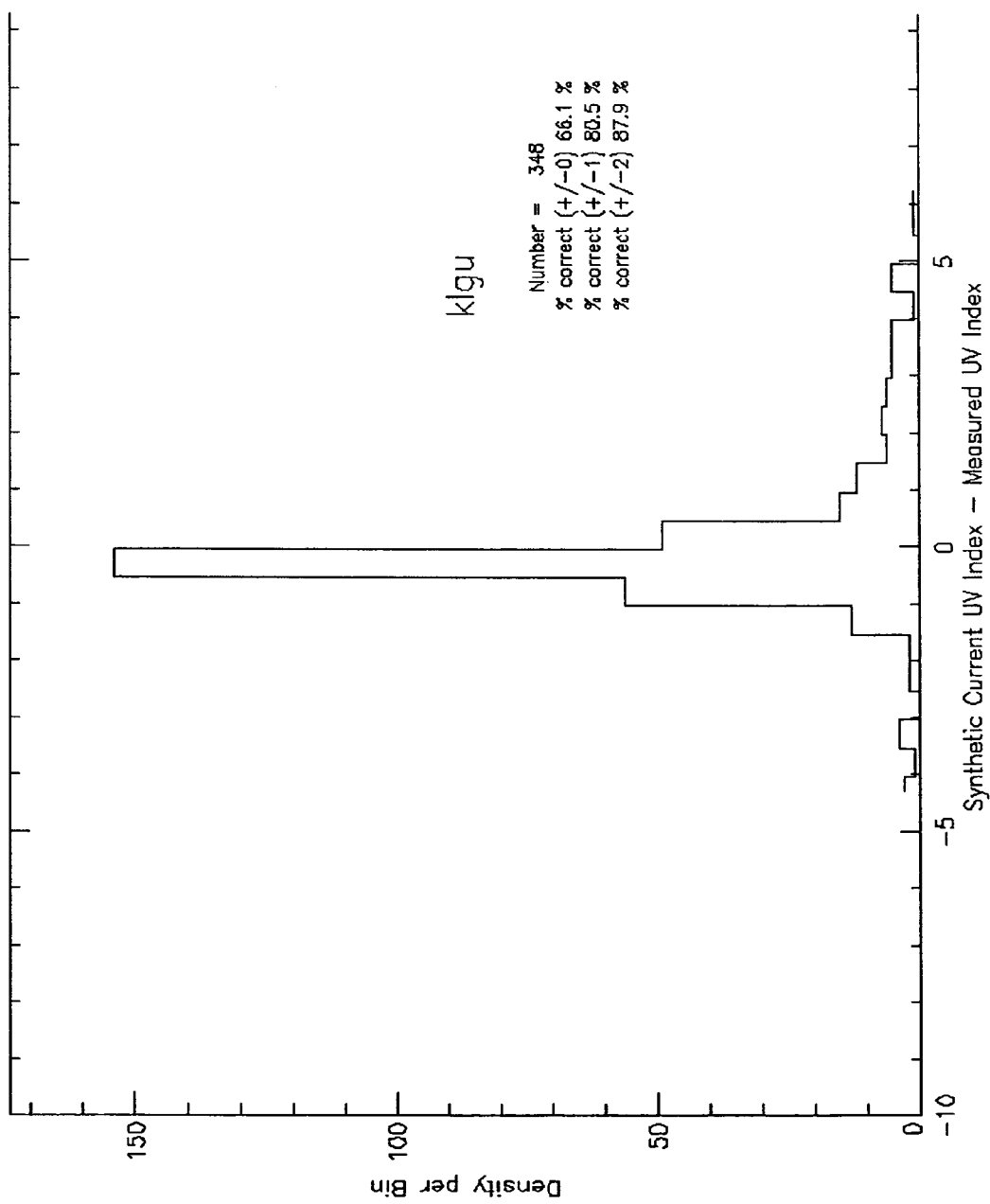
Figure 6I:
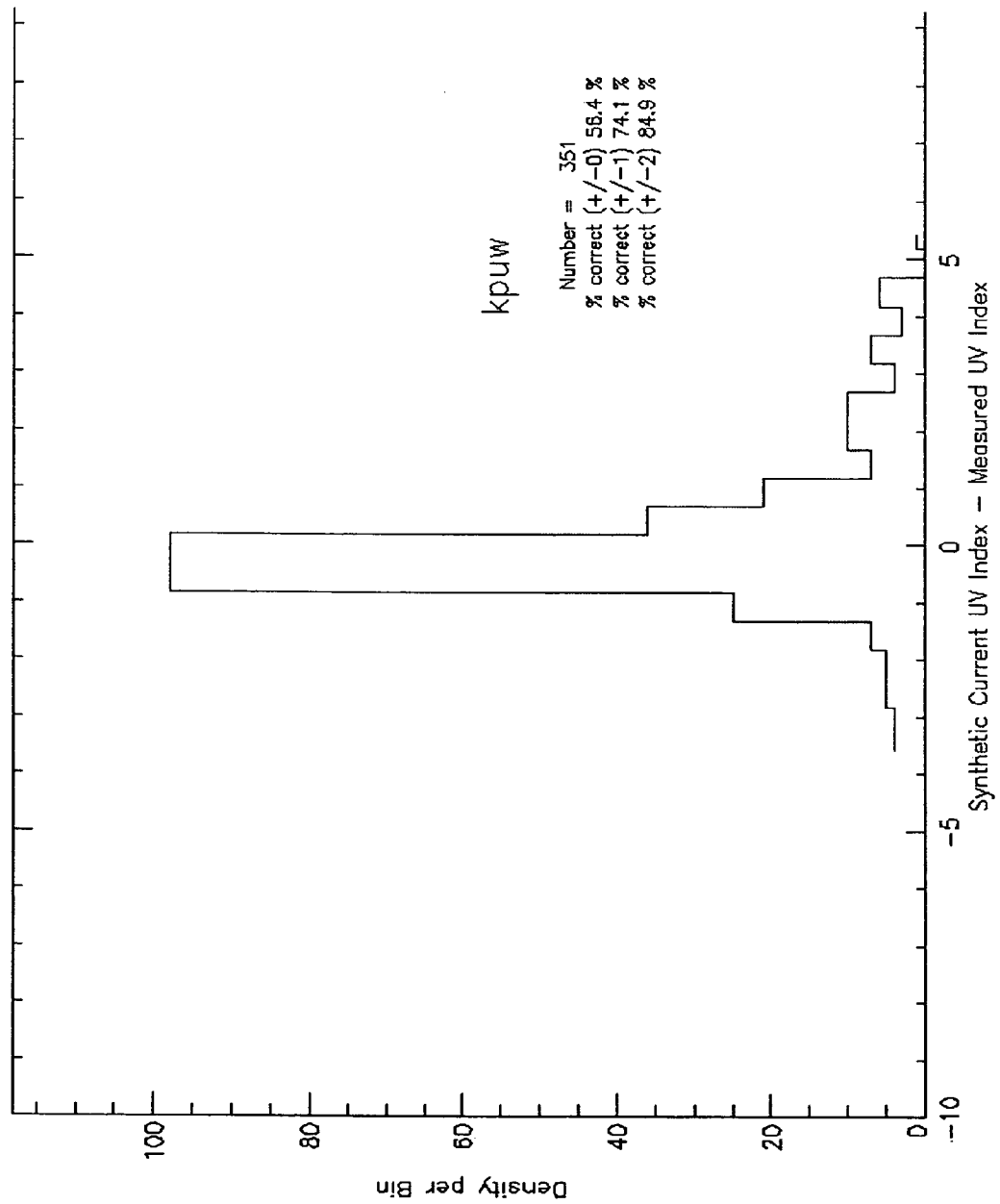
Figure 6M:
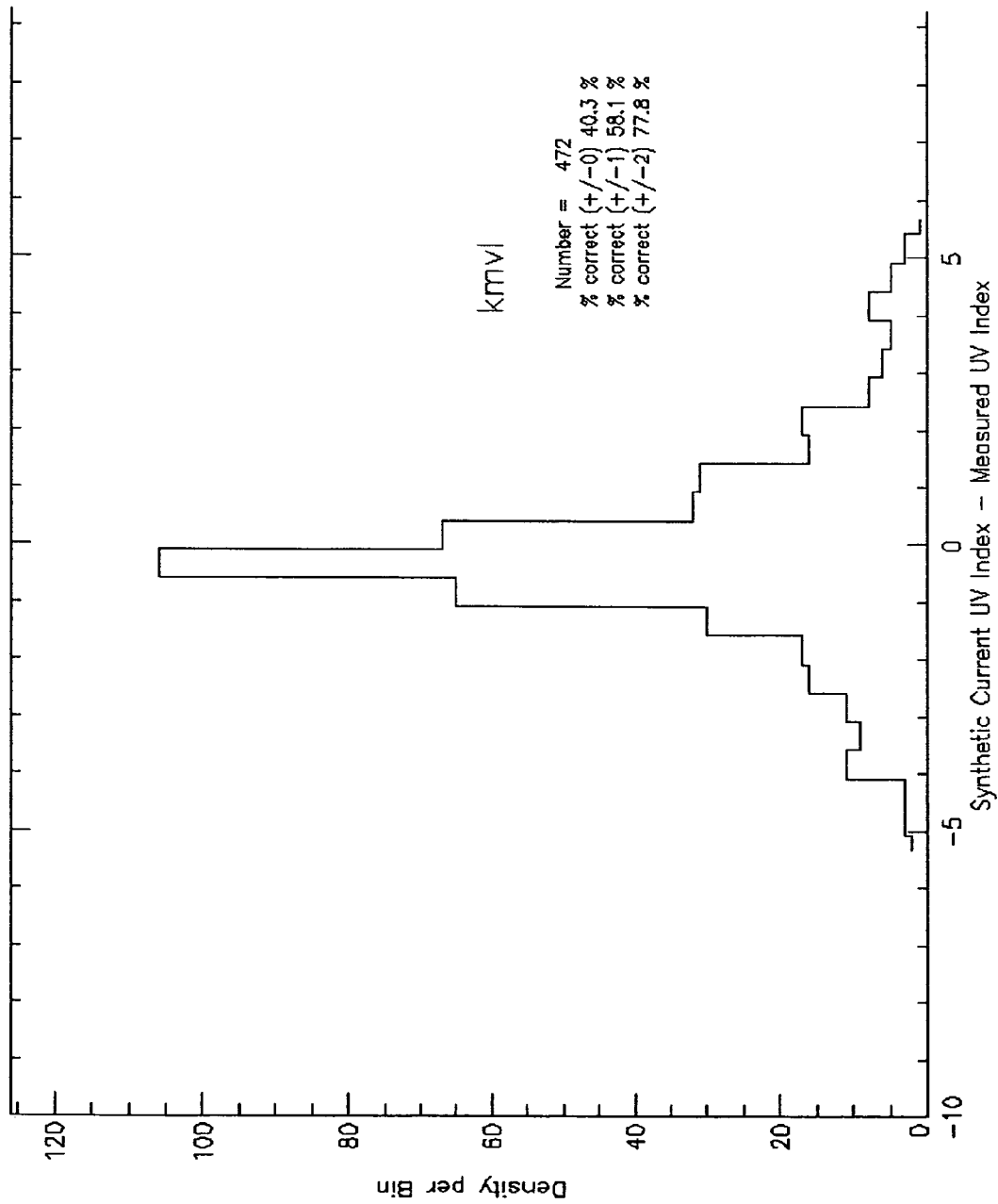

FIG. 4 shows a diagram of the logic described above for the calculation and verification of the synthetic UV index. In FIG. 4, the steps are as follows:

1) Calculate the clear sky UV radiation (no clouds) at any point knowing the location (geographical latitude and longitude), elevation, and total column ozone at any given time. Use the closest total column ozone available to the place where the clear sky UV radiation is calculated. This may be done using simple interpolation.

2) Adjust this clear sky UV radiation using the cloud attenuation factor (CLD). The cloud attenuation factor (CLD) is calculated using the percentage cloud cover.

3) Multiply the clear sky UV radiation obtained in (1) by the cloud attenuation factor (CLD) to obtain the cloud adjusted UV radiation.

4) Divide the cloud adjusted UV radiation in milli-Watts m−2 by 25 to convert it to UV index units.

Exemplary Results.

Verification of the Current Synthetic UV Index.

In one embodiment, the synthetic UV index may be verified against the measured UV index by the USDA UV network at 13 locations across the United States between Jul. 25, 2004 and Aug. 25, 2004. In this embodiment, a total of 6566 points are verified. In about 50% about 67% of the cases the synthetic UV index shows a difference of about +/−1 UV index unit from the measured UV index. In about 83% of the cases the synthetic UV index is within about +/−2 UV index units of the measured index. The cloud cover data used in the verification comes from the METAR stations. Only sky reporting METAR stations were used in the comparison.

FIG. 5 shows a histogram encompassing data for the 13 exemplary station locations. FIGS. 6a-6m shows individual histograms for all 13 stations. The places having the highest average cloud cover for the entire measuring period have the lowest correlation coefficient between the synthetic and observed UV index. The highest correlation between the synthetic and observed UV index is 0.98 found at KIPL (Imperial County Airport in desert California). The average cloud cover for this location was 21%. The number of identical cases at KIPL is 59.4% which corresponds to the second highest in this study. The highest number of identical cases corresponds to KLGU (Logan-Cache Airport in Utah) with 66.1%, 47% average cloud cover, and a correlation of 0.88 between the synthetic and the observed UV index. The lowest correlation coefficient (0.60) is found at KMVL (Morrisville-Stowe State Airport in Vermont). This location presents the highest average cloud cover (60%) of all locations considered in this study. The number of identical cases at KMVL is 40.3%, which corresponds to the fourth lowest. The lowest number of identical cases (35.7%) is found at KGCN (Grand Canyon National Park at an elevation of 2073 m) with 38% average cloud cover, and a correlation of 0.79 between the synthetic and the observed UV index.

Figure 7:
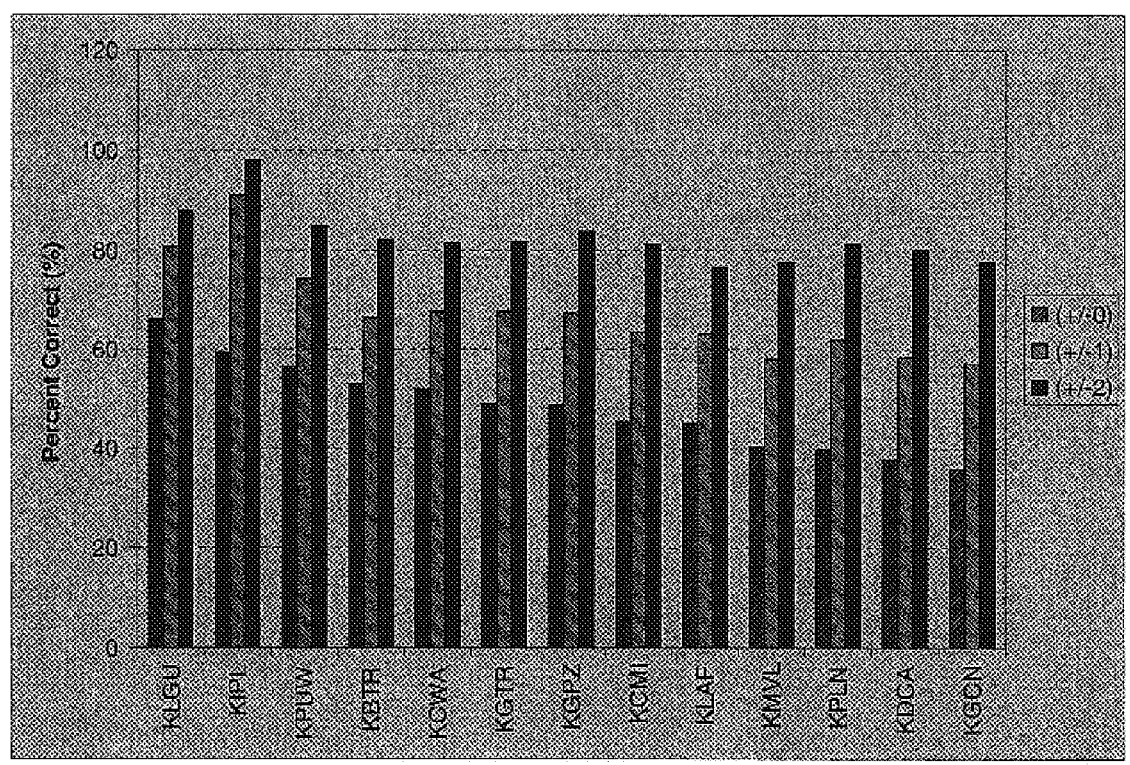
FIG. 7 is a bar graph comparing the percentage of UV index errors.
Figure 8:
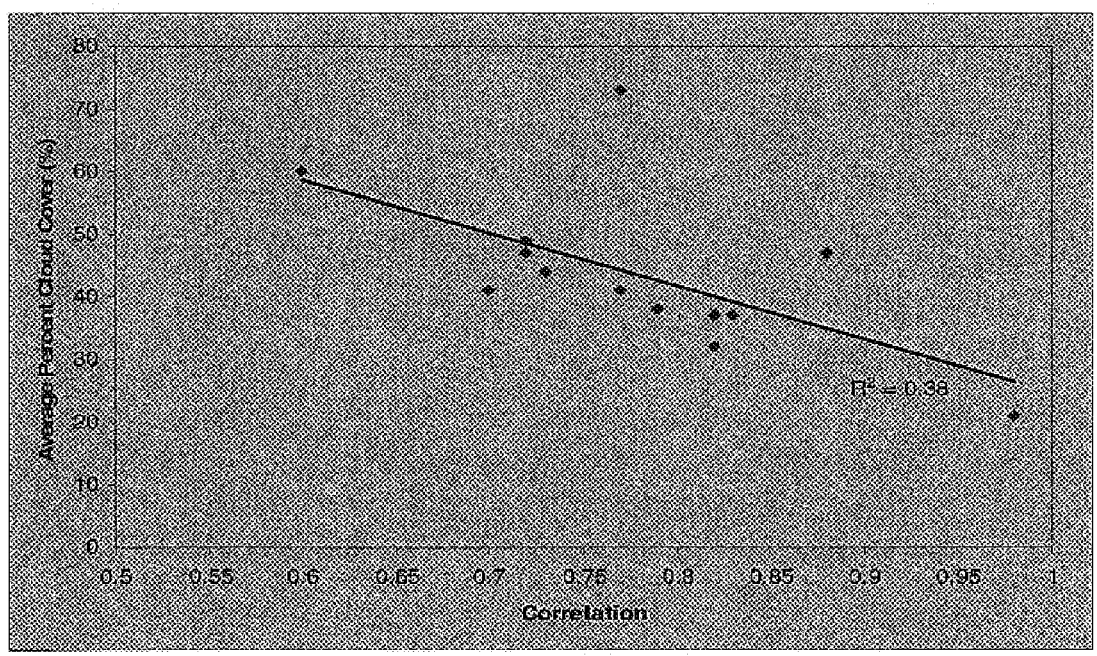
FIG. 8 shows an exemplary correlation of the thirteen regression coefficients with the average cloud cover for an exemplary month.

FIG. 7 compares the percentage of UV index errors for each of the three categories (+/−0, +/−1, and +/−2 UV index units) for all 13 locations. These data provide some guidance of what could be the highest and lowest accuracy that one could expect between the synthetic and observed UV index at different locations depending on the cloud cover climatology that a specific location may have. The correlation of the 13 regression coefficients with the average cloud cover for the whole month for each location yields a small correlation of R2=0.38 (see FIG. 8). This indicates that for locations with a higher cloud cover there is a smaller correlation between clouds and UV radiation.

However, there is no apparent correlation between the percentage of cases in each of the three accuracy categories (+/−0, +/−1, and +/−2 UV index units) and the monthly average cloud cover.

Exemplary Comparison of the Current Synthetic UV Index with Actual Sky Conditions.

This section shows exemplary results of calculating the current LV index for three given days. The results are presented graphically and compared against cloud cover from satellite images. The first two days (Sep. 27, 2004 and Apr. 21, 2005) show the calculation of the current synthetic UV index at METAR locations. The third day (Apr. 28, 2005) expands the calculation of the current synthetic UV index to nearly 10,000 cities across the United States, which allows for the distribution of the current UV index to a greater number of people across the country. The calculation of the UV index for Apr. 28, 2005 also takes into account GOES (Geostationary Operational Environmental Satellite)—augmented METAR clouds and compares the results to those obtained only using METAR-derived clouds.

Comparison at METAR Points.

1. Sep. 27, 2004.

Figure 9:
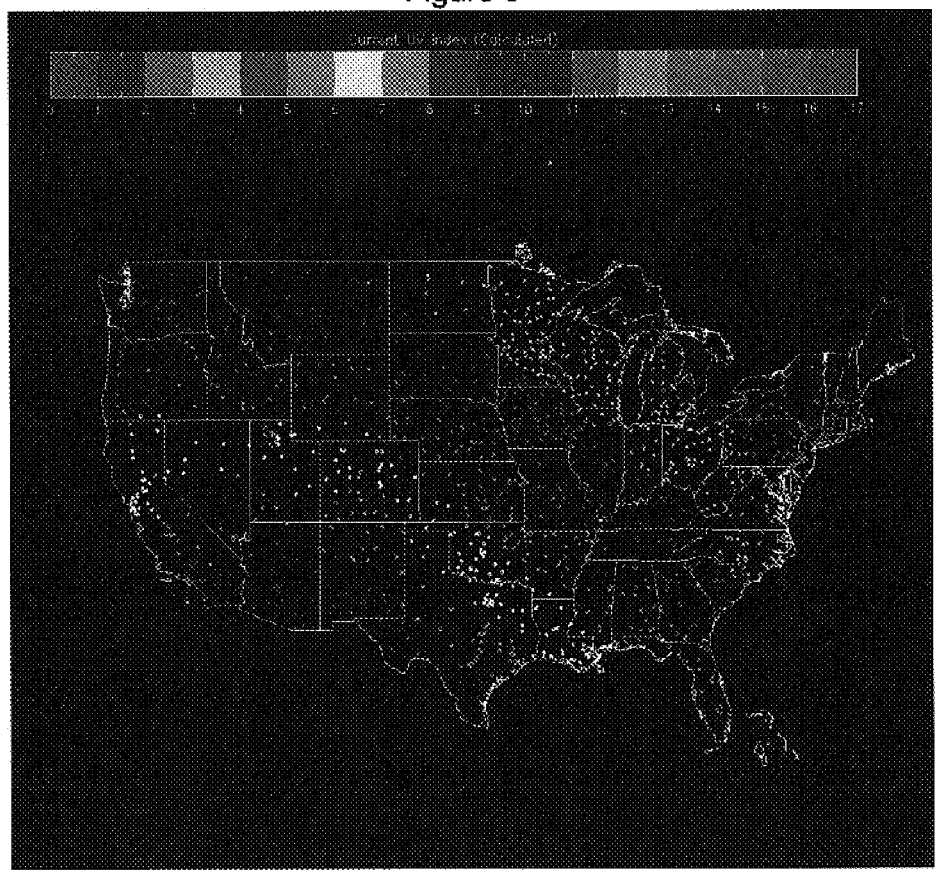
FIG. 9 shows the clear sky (no cloud included) current synthetic UV index for an exemplary observation.
Figure 10:
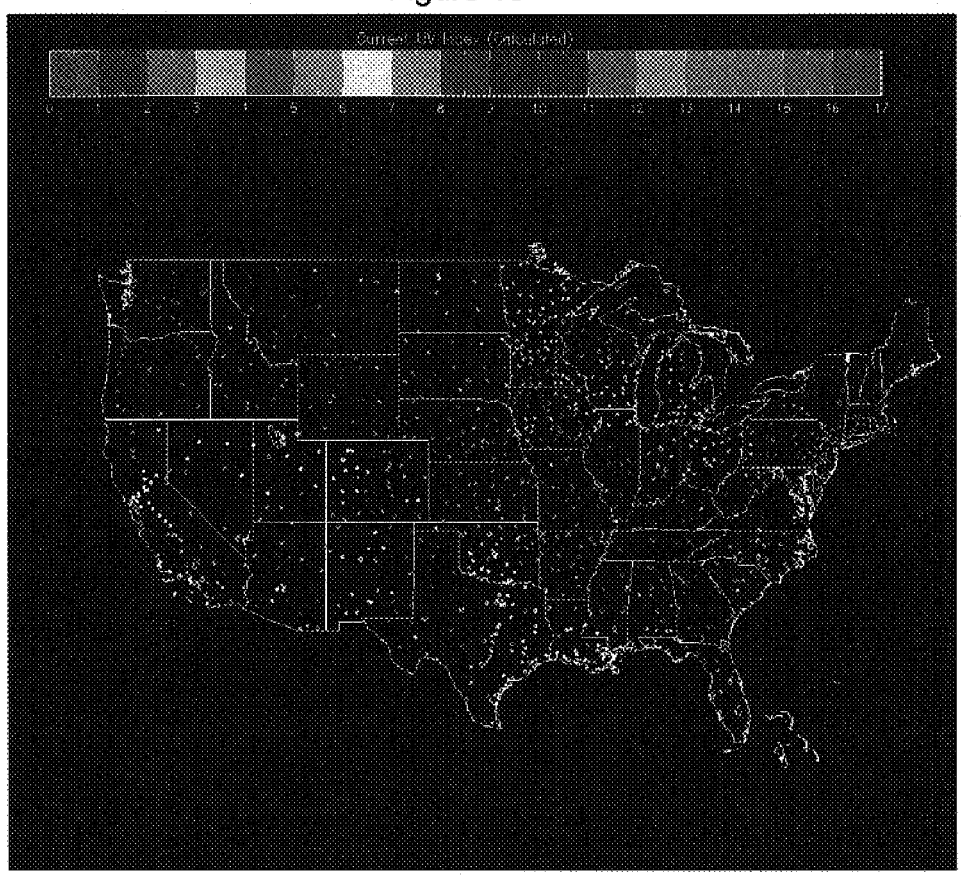
FIG. 10 shows the calculated current synthetic UV index for the actual sky conditions (clouds included) for the exemplary observation.

The UV index is calculated for Sep. 27, 2004 when the remnants of hurricane Jeanne moved over the southeastern United States. FIG. 9 shows the clear sky (no clouds) current synthetic UV index for the most recent observation issued between 1950Z and 1958Z for each of the 1272 METAR observations that reported sky conditions for Sep. 27, 2004. The calculation corresponds to the maximum clear sky UV index that would have been measured without the presence of clouds. FIG. 10 shows the calculated current synthetic UV index for the actual sky conditions that were reported by the METAR observations. The calculation corresponds to synthetic UV index that would have been measured considering the effects of clouds. Total column ozone values from the (Total Column Ozone Mapping Spectrometer) TOMS satellite are used to account for the effects of ozone on UV radiation.

Note that most of the METAR observations, with the exception of specials (additional observations reported during times of active weather), come in around 53 minutes after each hour. However, the Automated Weather Observation System (AWOS) stations come in at different times and are not used in this study to calculate the current UV index. The time window between 50 and 58 minutes after the hour was used to ensure that most of the observations are captured, even if they are reported at slightly different times at different stations.

Figure 11:
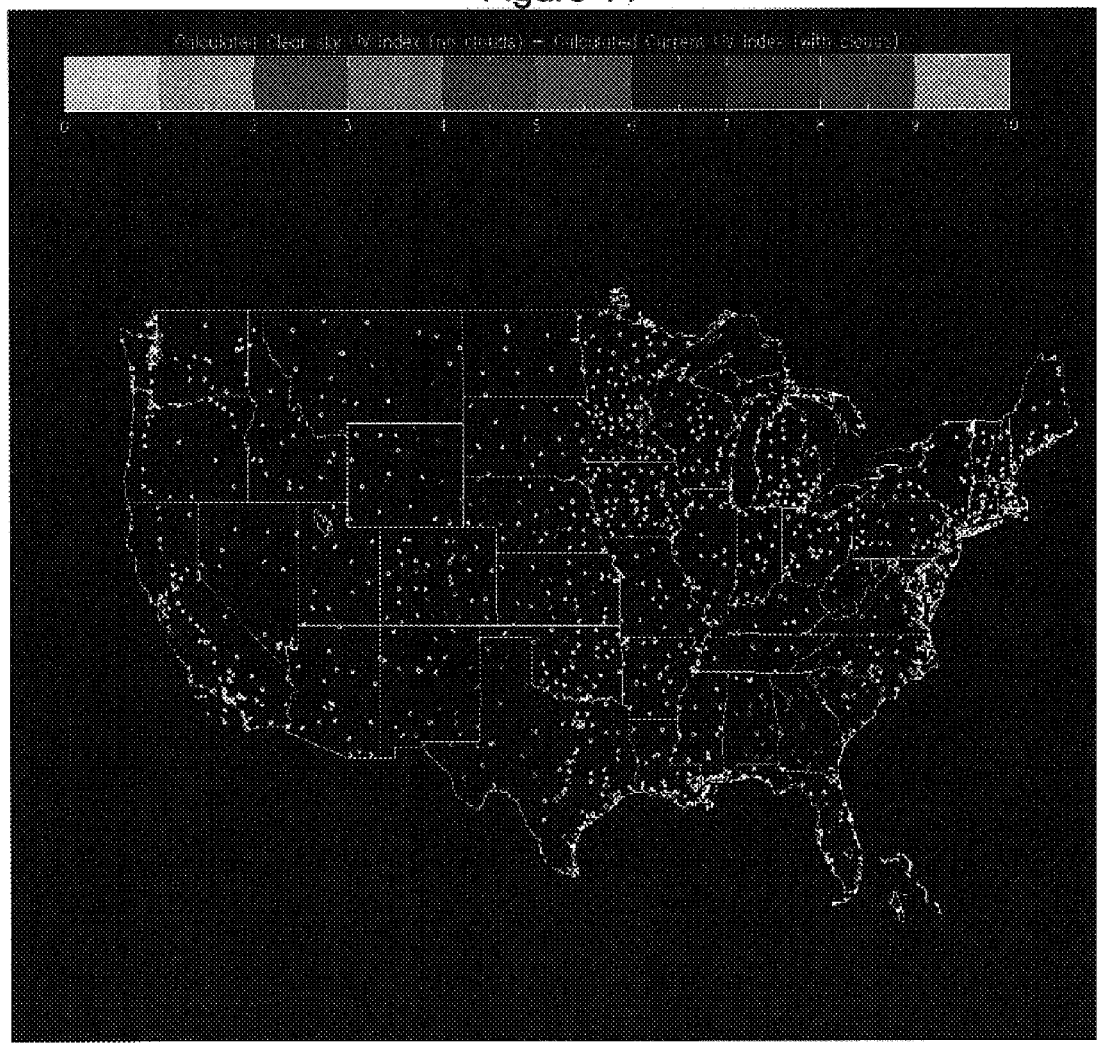
FIG. 11 shows the UV index reduction due to clouds from the clear sky UV index shown in FIG. 9.

FIG. 11 shows the V index reduction from the clear sky L index shown in FIG. 9. This includes the UV index reduction due to clouds (e.g., clear sky UV index—UV index considering clouds) for Sep. 27, 2004 from 1950Z to 1958Z. The largest reductions, four (4) UV index units, correspond to a difference of 100 W m−2 of erythemal UV radiation in western Texas, Alabama, and Georgia associated with the remnants of hurricane Jeanne.

Figure 12:
FIG. 12 shows the observed percentage cloud cover as reported from exemplary surface METAR stations for the exemplary observation.

The derived percentage cloud cover from the METAR reports is shown in FIG. 12. This includes the observed percentage cloud cover as reported from the surface METAR stations from 1272 locations across the United States for Sep. 27, 2004 (1950Z-1958Z). The warm colors correspond to higher amounts of cloud cover. The largest amounts of cloud cover are found along a cold front that extended from southern Colorado to the Great Lakes and associated with the remnants of hurricane Jeanne in the eastern United States. Other less widespread areas of cloud cover are found in the Cascade Mountains near the Canadian border, coastal central California, associated with the intrusion of the marine layer over the coastal areas, and Wyoming and Montana associated with the cold front and mountain convection.

Figure 13:
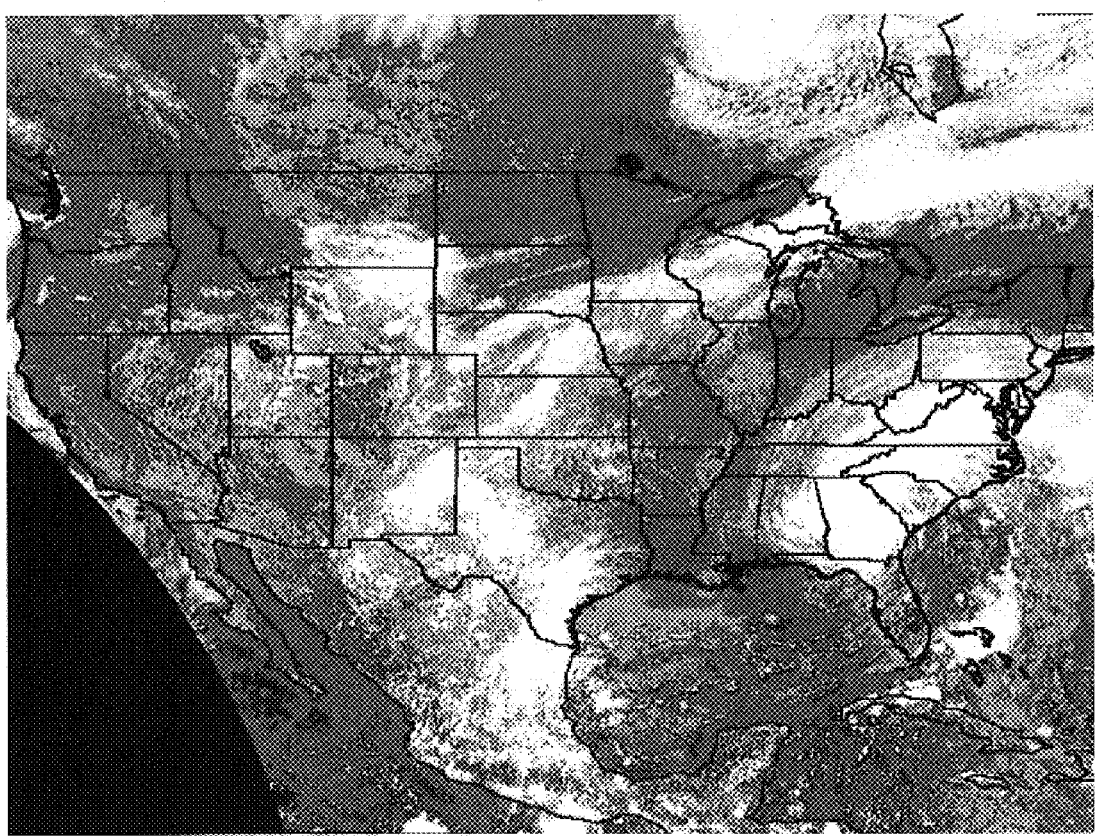
FIG. 13 shows an exemplary satellite image for the exemplary observation.
Figure 14:
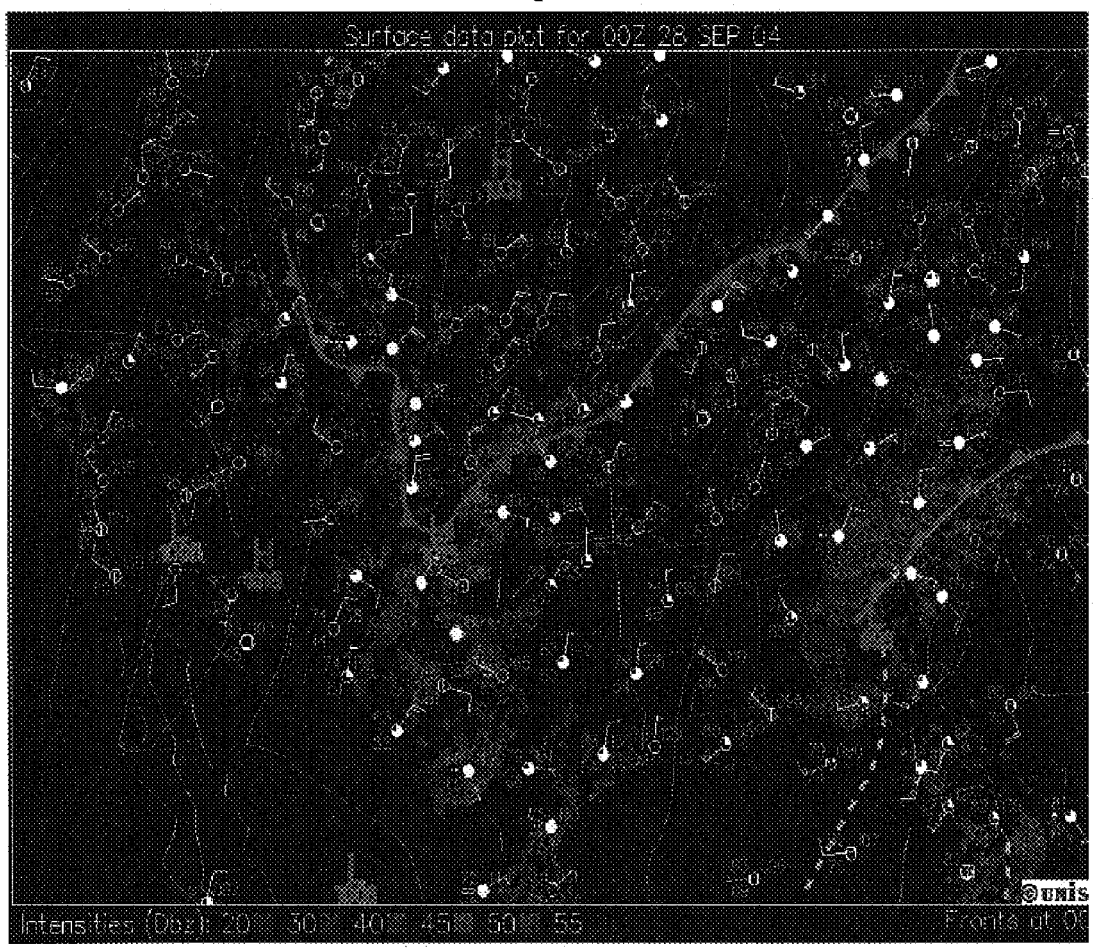
FIG. 14 shows exemplary surface meteorological features and sky conditions for the exemplary observation.

FIG. 13 shows the satellite image that corresponds to 2015Z on Sep. 27, 2004, only fifteen minutes later than the simulation time. As shown, in the southeastern United States the remnants of hurricane Jeanne move toward the northeast. Over western Texas an upper level low pressure is responsible for abundant cloudiness in the center of the United States. From Colorado to the Great lakes a cold front separates cooler drier air from the Canadian prairies from warmer air to the south. Fog and stratus clouds are observed off the west coast. The surface meteorological features and sky conditions for selected METAR locations for 00z on Sep. 28, 2004 are shown in FIG. 14.

2. Apr. 21, 2005.

Figure 15:
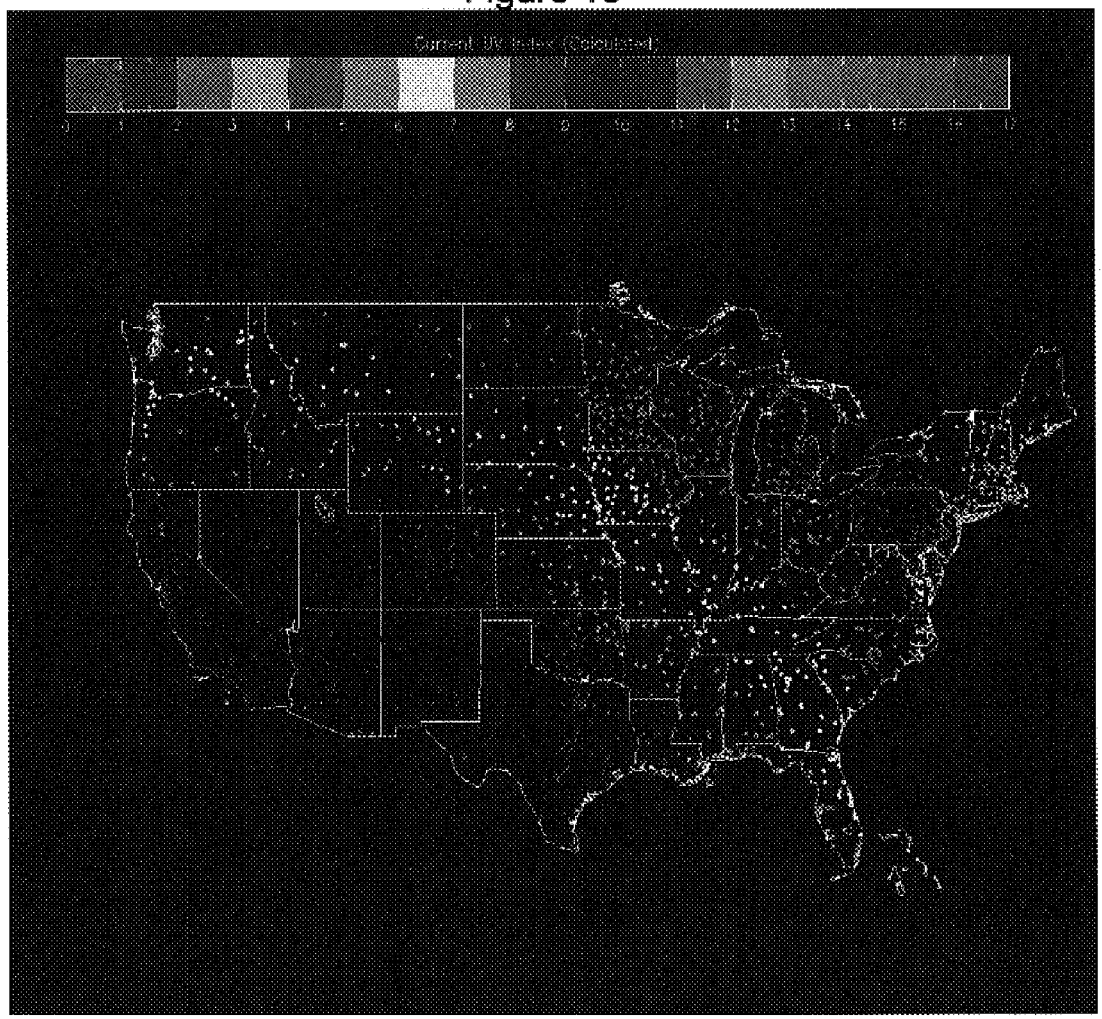
FIG. 15 shows the clear sky (no cloud included) current synthetic UV index for another exemplary observation.
Figure 16:
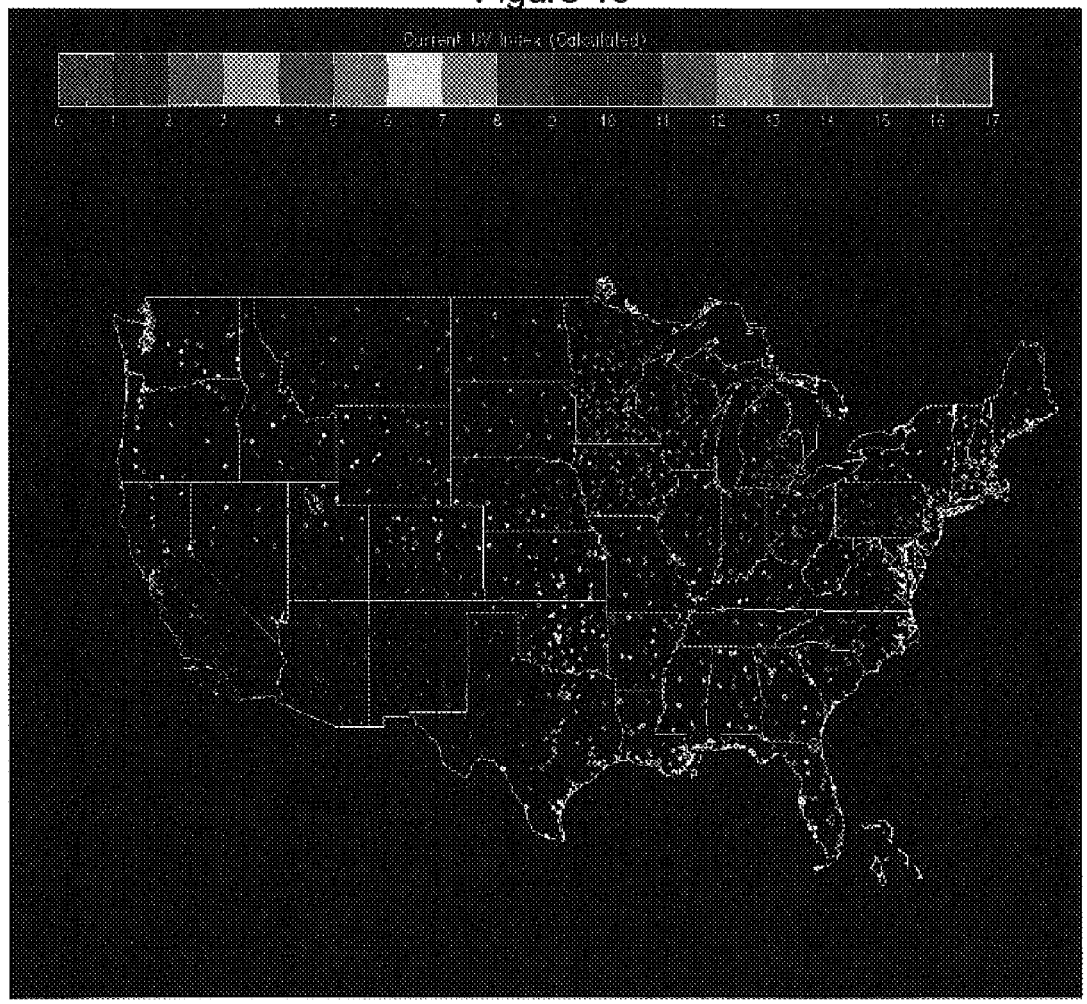
FIG. 16 shows the calculated current synthetic UV index for the actual sky conditions (clouds included) for the exemplary observation of FIG. 15.

Apr. 21, 2005 shows a low pressure system located over east Kansas with associated cloud masses extending over a large portion of the United States. FIG. 15 shows the synthetic clear sky UV index (no clouds) for Apr. 21, 2005 at 1953Z. The calculation corresponds to the maximum clear sky UV index that would have been measured without the presence of clouds. The most recent METAR cloud cover report for each point collected from 1950Z to 1958Z is used in the simulation. Higher elevations of the Rocky Mountains increase the UV index by one unit compared to nearby points. FIG. 16 shows the calculated current synthetic UV index including clouds. The calculation corresponds to synthetic UV index that would have been measured considering the effects of clouds.

Figure 17:
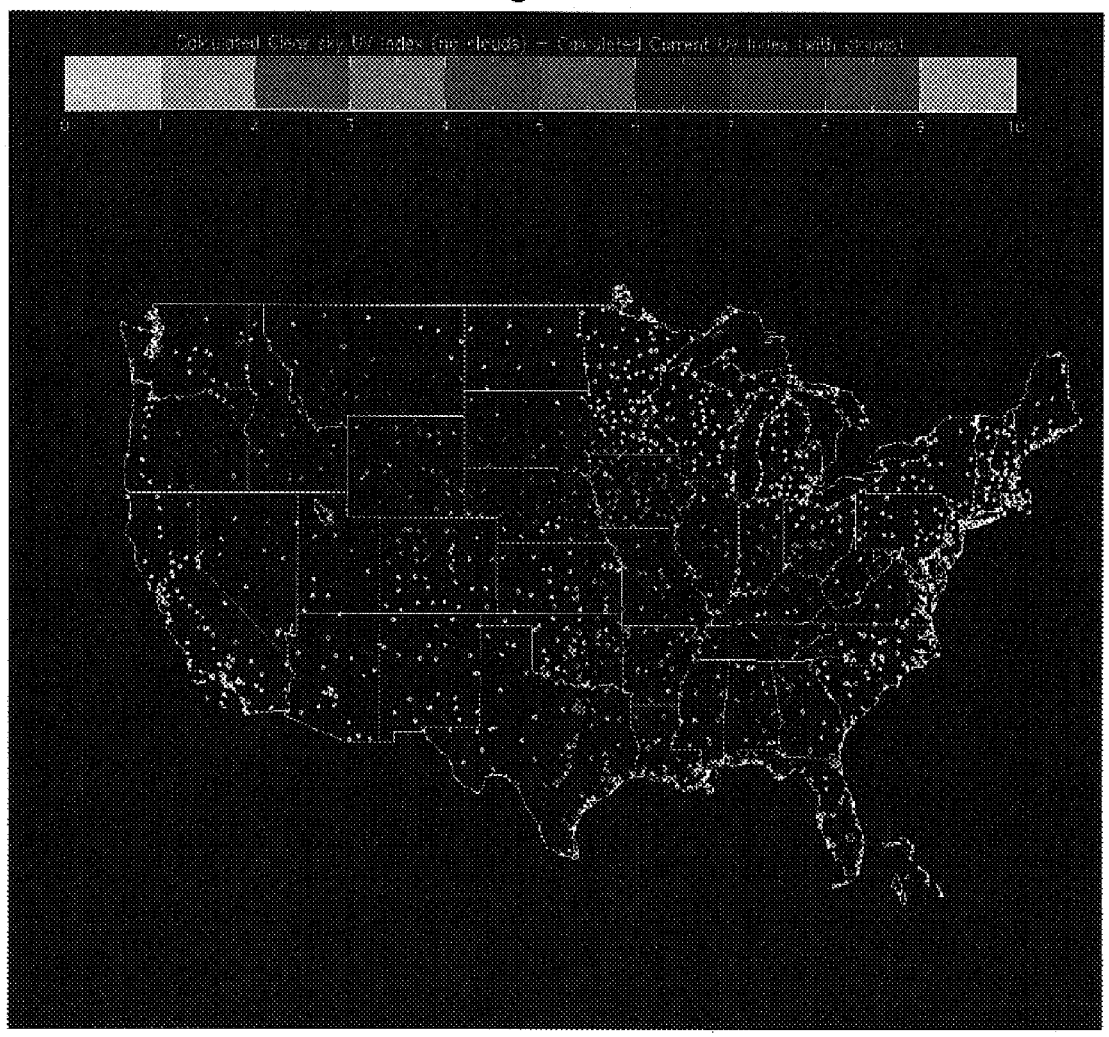
FIG. 17 shows the UV index reduction from clear skies due to the effects of clouds for the exemplary observation of FIG. 15.
Figure 18:
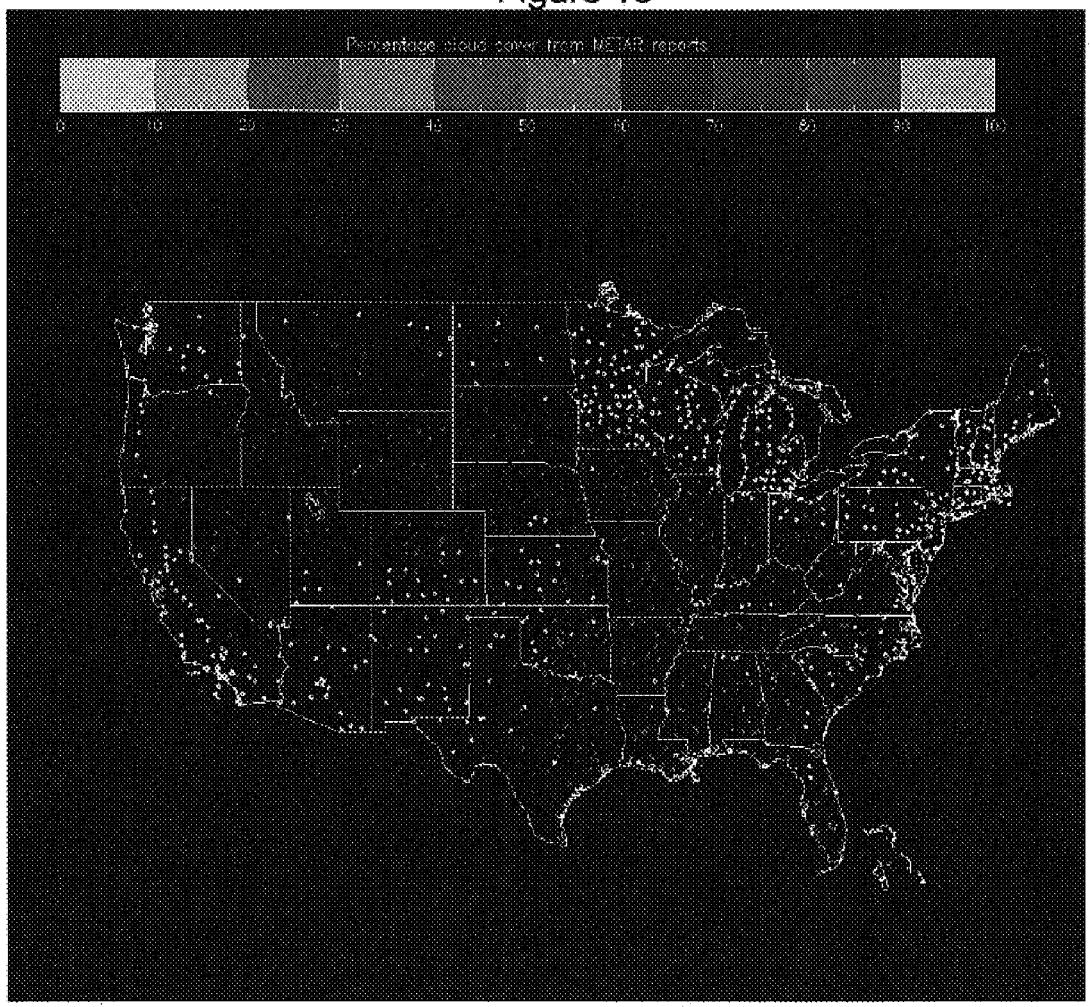
FIG. 18 shows the observed percentage cloud cover as reported by exemplary METAR stations used as inputs for the results shown in FIG. 16.

FIG. 17 shows the UV index reduction from clear skies due to the effect of clouds (e.g., clear sky UV index—UV index considering clouds) for Apr. 21, 2005 from 1950Z to 1958Z. FIG. 18 shows the percentage cloud cover reported by the METAR stations used as input for the results shown in FIG. 16. FIG. 18 shows the observed percentage cloud cover as reported from the surface METAR stations from 1272 locations across the United States for Apr. 21, 2005 (1950Z-1958Z). Clouds in southern Texas reduced the clear sky UV index by a maximum 5-6 UV index units (brownish color). Reductions of 2-5 UV index units are common in the mass of clouds that extends from Oregon to Maryland. The UV index reduction ranges between 2-5 UV index units from Oregon to Nebraska and 1 UV index units eastward toward Maryland.

Figure 19:
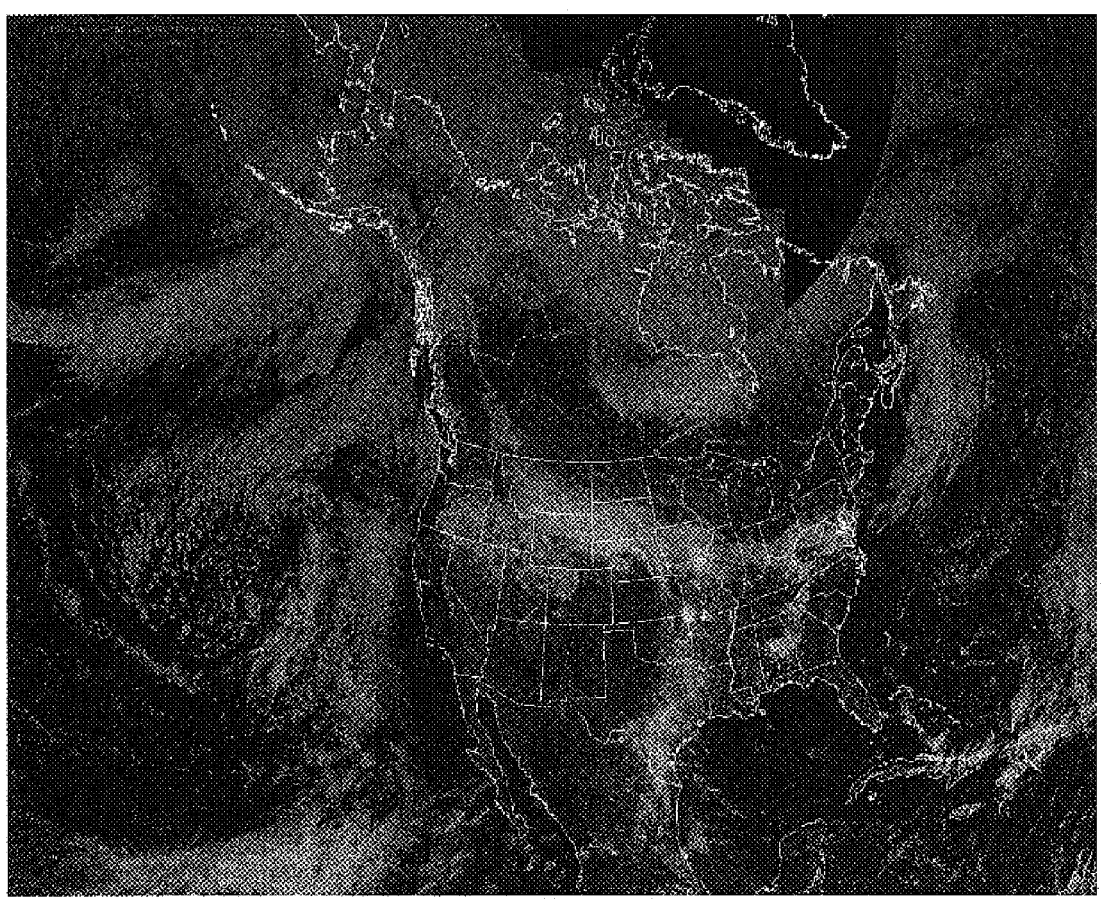
FIG. 19 shows an exemplary satellite image.
Figure 20:
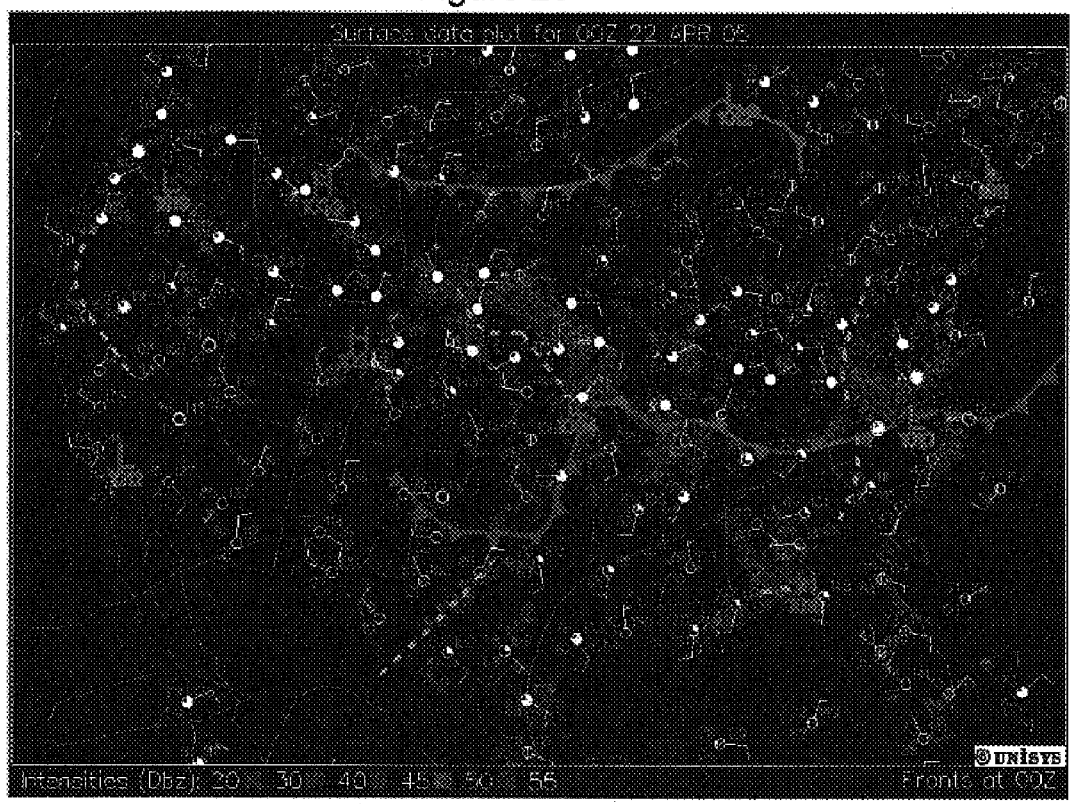
FIG. 20 shows exemplary surface meteorological features and sky conditions.

FIG. 19 shows the satellite image for Apr. 21, 2005 at 2004Z. As shown, a low pressure area over eastern Kansas with an associated cold front stretching south into Texas and occluded front extending to coastal Virginia dominate the weather features this day. FIG. 20 shows the surface meteorological features at 00Z (Apr. 22, 2005).

The results presented here show that the current synthetic UV index represents well the reduction in UV radiation associated with the different areas of clouds in the country. Even the small area of clouds in the Cascade Mountains is captured by the current synthetic UV index. The best correlation of results can be found in those regions where there is a high density of METAR stations.

Comparison of the UV Index Derived Using METAR-derived Clouds with the UV Index Derived Using GOES-augmented METAR Clouds.

In the previous section the current UV index was calculated using METAR cloud cover data solely from METAR stations. In this section this approach is expanded to include both GOES and METAR derived cloud cover data in the calculation of the current UV index. The GOES data comes from the GOES satellite, which provides effective cloud amount information in support of the Automated Surface Observing System (ASOS). This data may be valid at the top of every hour and it may be available 15 minutes after the top of the hour. Wylie and Menzel (1999) describe the technique used to derive effective cloud amount from the GOES imager which uses the $CO_2$ absorption technique.

One skilled in the art will appreciate the distinction between using the GOES data set to augment sky cover reported in a METAR and using it to fill in sky cover information where none exists. The latter scenario will occur when a station fails to report any sky cover, either due to instrument failure or lack of any ceiling/visibility instrument. One skilled in the art will also appreciate that the GOES data set and the METAR reported sky cover do not measure the same quantity. The GOES data set is valid for middle and high levels (above 630 hPa layer) while the automated METAR sky cover is usually valid below 3658 m (12,000 feet). There are times when they overlap, such as when a METAR reports sky cover in the midlevel or above 3658 m. These overlap cases represent the biggest challenge. There may also be temporal inconsistencies. Therefore, the preferred strategy for dealing with temporal inconsistencies between METAR and GOES may be to use a conservative approach—only incorporate GOES when it is certain that it will enhance an automated METAR and will not "overrule" a legitimate METAR-reported sky cover.

Two separate algorithms are developed and may be used to augment the METAR cloud cover depending on whether a station reports clouds or if it is manned or automatic. Stations in the "no sky cover" list may be modified according to the following algorithm: (1) determine the exact time of the METAR observation; (2) determine weather a GOES satellite observation exists for the station within a fixed time (temporal consistency check); (3) if a GOES observation exists, and it reports high or mid level cloud coverage at BKN or higher, then populate the sky cover field for that station and that hour. Automated stations that report sky cover and do not fall into either the "24 hour manned" list or the "no sky cover" list may be modified in the following manner: (1) determine the exact time of the METAR observation; (2) determine whether a GOES satellite observation exists for the station within a fixed time (temporal consistency check); (3) if a GOES observation exists check the sky cover of the METAR observation; (4) if METAR=(SKC∥CAVOK∥CLR∥MISSING) then replace the METAR-based sky cover with the GOES sky cover only if the GOES reports at least SCT coverage at some level; (5) otherwise, if the METAR reports some cloud layers, augment the report by adding additional GOES high or mid level cloud information, where available. Essentially this means that we don't drop valid METAR cloud layers, only add to them where the GOES provides extra information.

Once the augmentation process is complete at all METAR locations the cloud cover data may be expanded to approximately 10,000 cities across the United States using Hirad System of the Weather Channel, Inc. similar to the Real Time and Retrospective Mesoscale Objective Analysis which originated in the National Weather Service to develop a process to produce real-time, National Digital Forecast Database (NDFD) matching resolution analyses, which has begun to be referred to as an "Analysis Of Record" (AOR). Details of the Weather Channel Hirad System are disclosed in U.S. patent application Ser. No. 11/021,801, entitled "Producing High-Resolution, Real-Time Synthetic Meteorological Conditions From Radar Data," filed Dec. 22, 2004 and U.S. patent application Ser. No. 11/042,681, entitled "System For Producing High-Resolution, Real-Time Synthetic Meteorological Conditions For A Specified Location," filed Jan. 25, 2005; which are incorporated herein by reference in their entirety. In one embodiment, the initial conditions (t=0) can be used to derive current cloud cover reports at 10,000 locations across the United States. Additional details of this system and its performance are described by Neilley and Rose (2006) and Koval et al (2006).

Figure 21:
FIG. 21 shows exemplary observed percentage cloud cover as reported from surface METAR stations from about 1272 locations across the continental United States for another exemplary observation.
Figure 22:
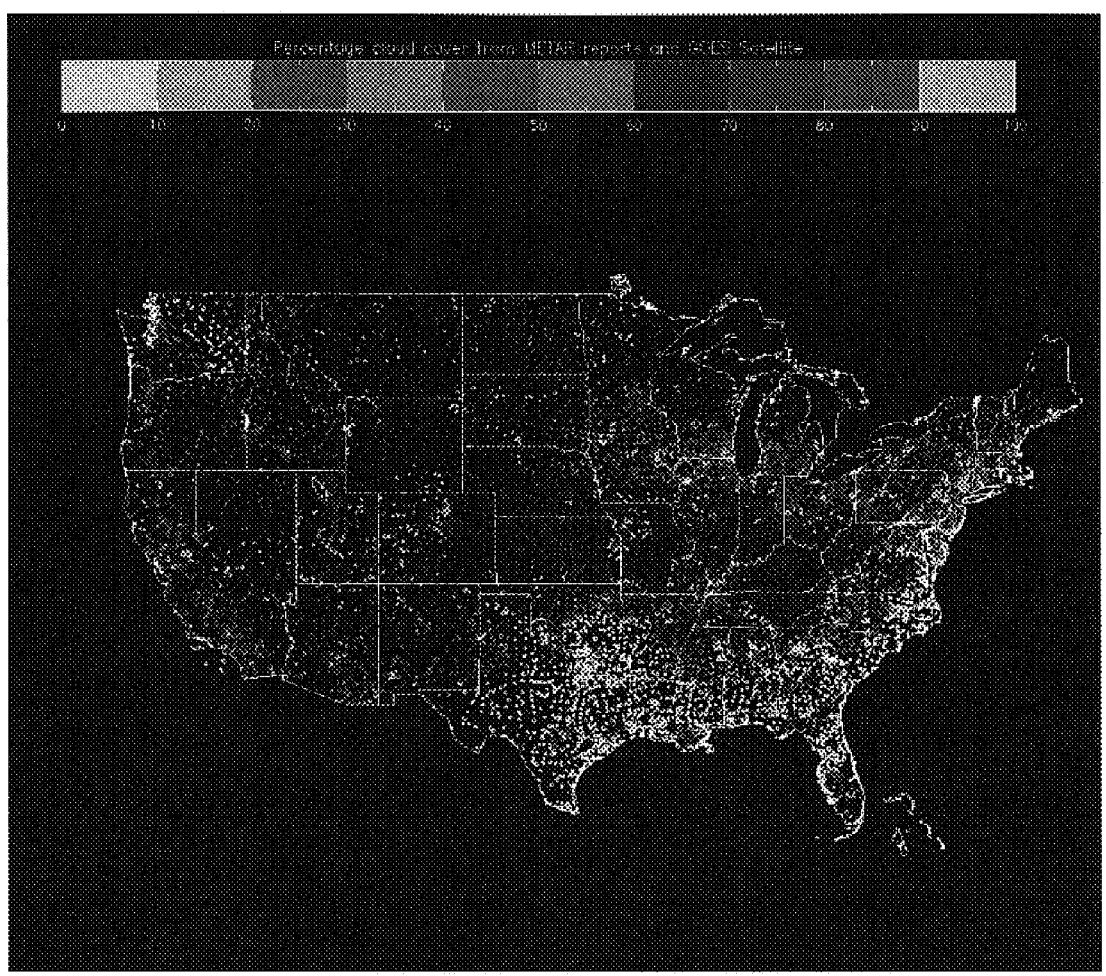
FIG. 22 shows exemplary observed Geostationary Operational Environmental Satellite (GOES) augmented METAR stations expanded to approximately 10,000 locations across the continental United States for the exemplary observation of FIG. 21.

The GOES augmented cloud cover is able to detect clouds that the ASOS network cannot detect. FIGS. 21 and 22 show the METAR and GOES-augmented METAR clouds, respectively, for the continental United States for 2000z Apr. 28, 2005. Specifically, FIG. 21 shows the observed percentage cloud cover as reported from the surface METAR stations from 1272 locations across the United States for Apr. 28, 2005 (1950Z-1958Z) and FIG. 22 shows Observed percentage cloud cover from the Geostationary Operational Environmental Satellite (GOES) augmented METAR stations expanded to nearly 10,000 locations across the United States for Apr. 28, 2005 (1950Z-1958Z).

Figure 23:
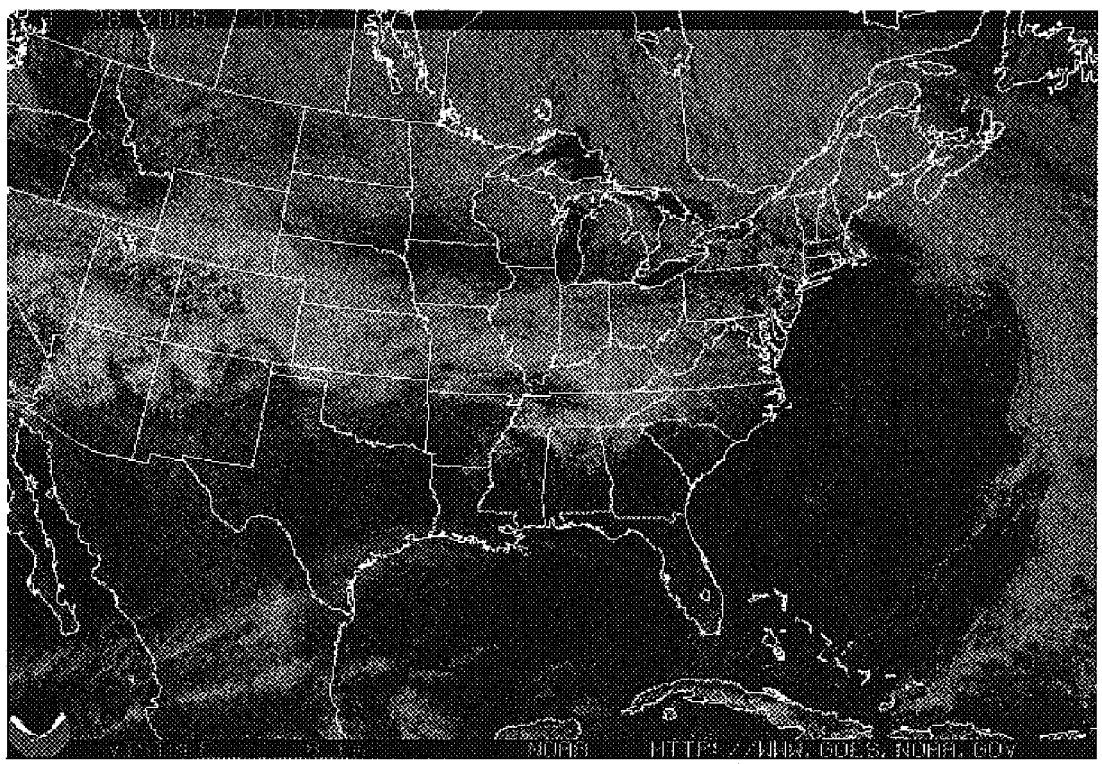
FIGS. 23 and 24 show exemplary satellite images from the GOES east and west satellites for the exemplary observation of FIG. 21.
Figure 24:
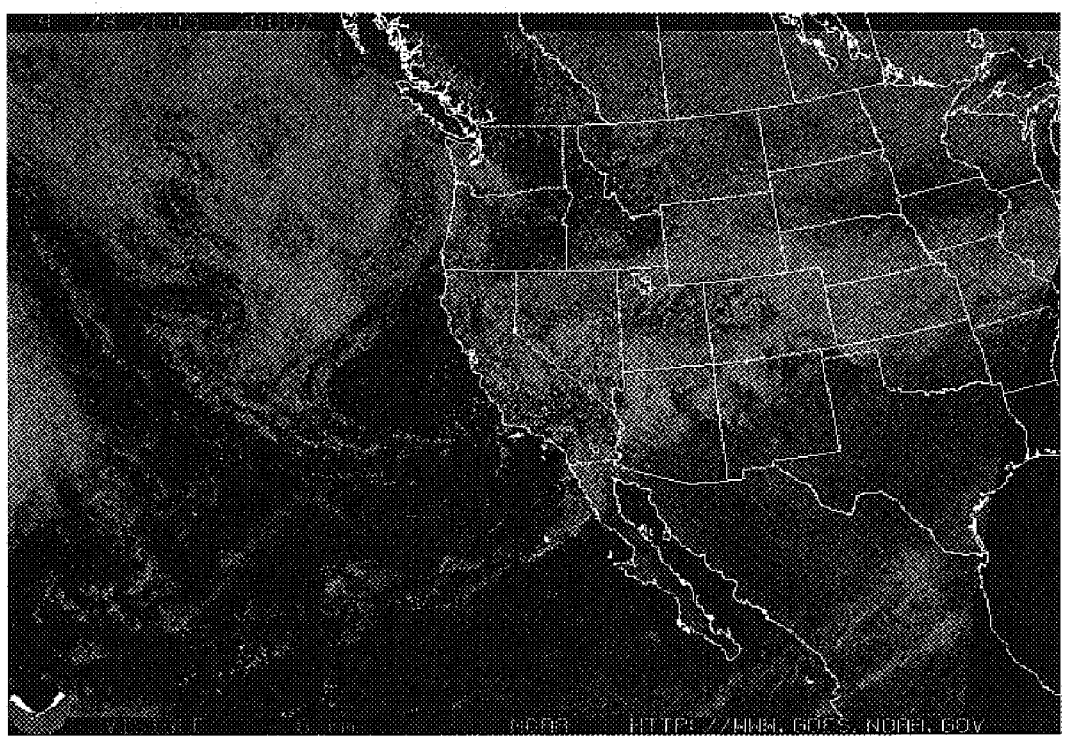
Figure 25:
FIG. 25 shows a detail of the exemplary GOES east image.

FIGS. 23 and 24 show the satellite images from the GOES east and west satellites at 2015z and 2000z, respectively. For example, areas of western and central North Carolina and northwestern South Carolina are covered by cirrus and altostratus clouds (FIG. 25) that are depicted as partly cloudy or clear by the automated METAR reports. ASOS stations report anywhere between 0-30% cloud cover in these areas. However, manned METAR stations report cloud cover amounts greater than 60% in the same areas. KFBG (Fort Bragg) in central-eastern North Carolina or KATL (Atlanta, Ga.) show as dark red dots surrounded by yellow or blue dots in FIG. 21 to FIG. 22. The same effect can be seen in other areas where manned METAR stations are surrounded by ASOS stations. KLBB (Lubbock), KSAT (San Antonio) and KIAH (Houston) in Texas are manned METAR stations capable of reporting cloud cover above 3658 m. The high cirrus clouds that stretch over south Texas (FIG. 23) cannot be detected by the surrounding ASOS stations. The GOES augmented cloud cover captures well the high clouds in central North Carolina and northwestern South Carolina as well as other surrounding regions. The gap in clouds that extends over northern Illinois and Indiana (FIG. 23) is well captured by the METAR and the GOES augmented data.

Figure 26:
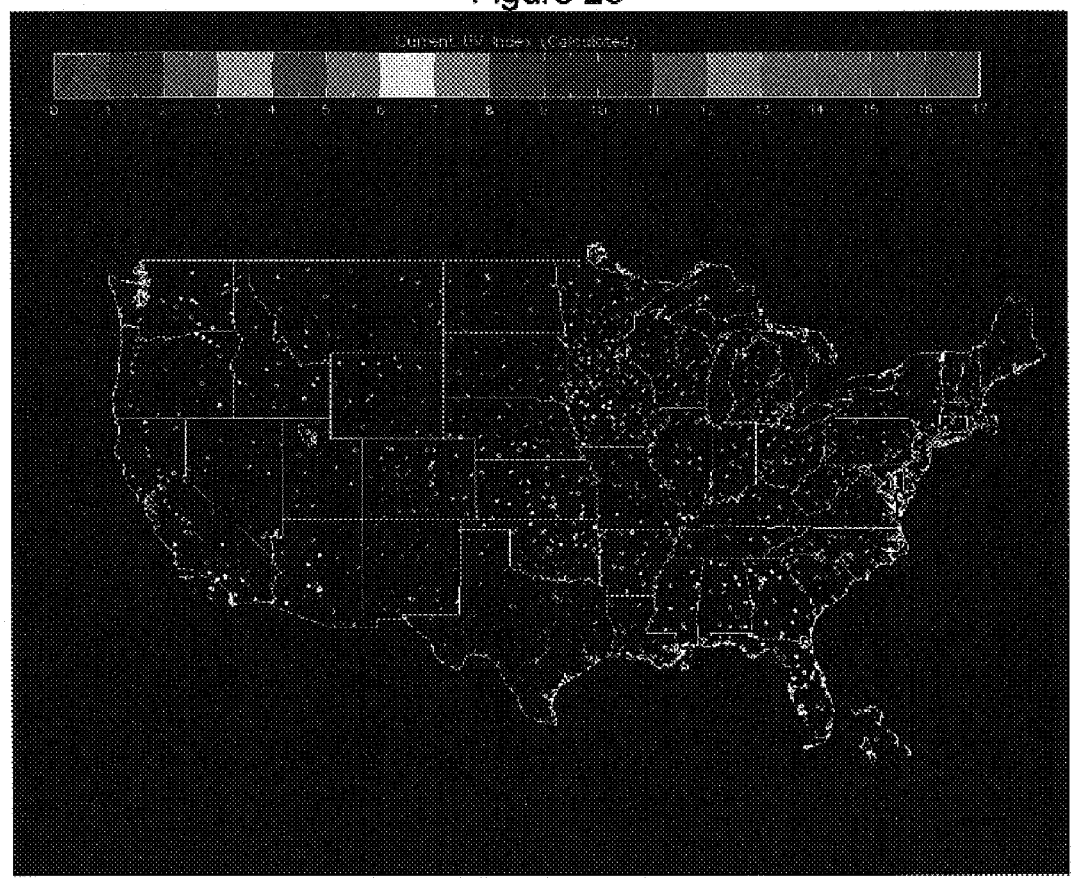
FIG. 26 shows the current synthetic UV index (METAR only) for an exemplary observation.
Figure 27:
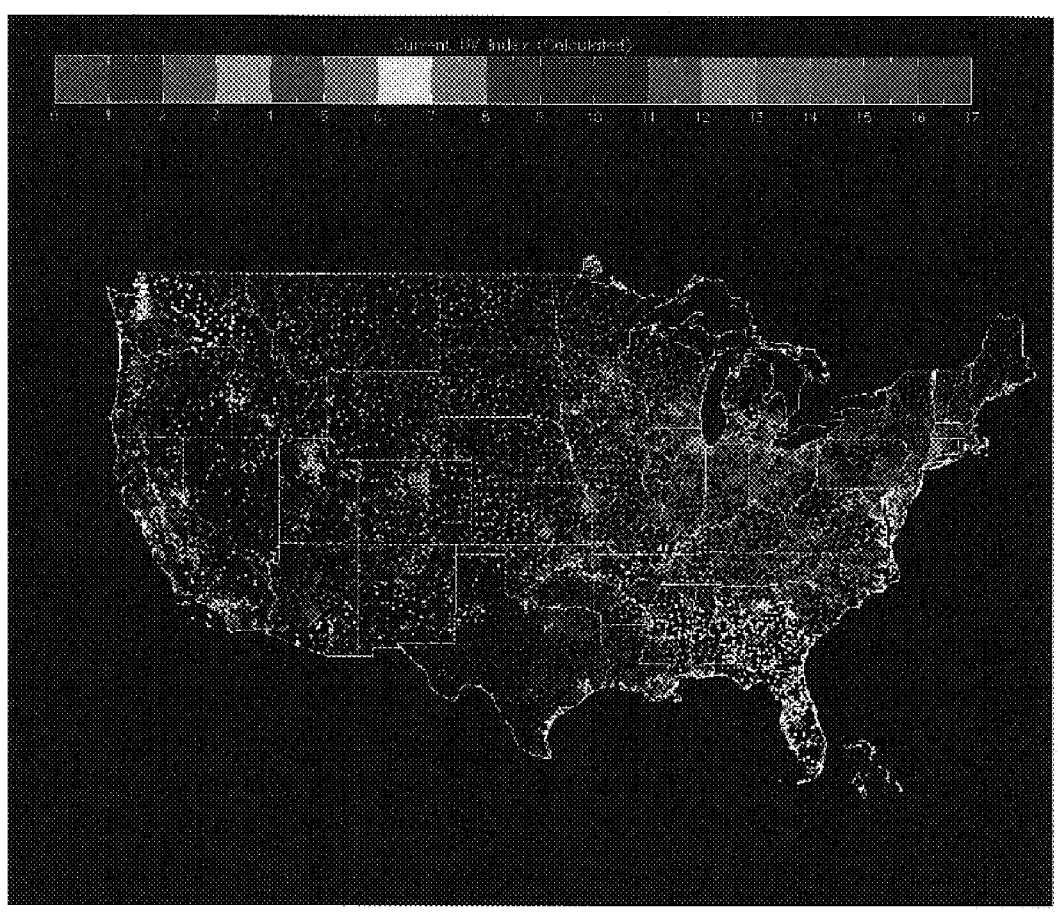
FIG. 27 shows the current synthetic UV index (GOES augmented) for the exemplary observation of FIG. 26.

FIG. 26 (METAR only) and FIG. 27 (GOES augmented) show the calculated current UV index for 20z for the sky conditions reported at the same hour. Specifically, FIG. 26 shows a simulation of the synthetic UV index for Apr. 28, 2005 (1950Z-1958Z) and FIG. 27 shows a simulation of the synthetic UV index for Apr. 28, 2005 (1950Z-1958Z). The calculation corresponds to synthetic UV index that would have been measured considering the effects of clouds. The calculation is expanded to approximately 9,500 points.

Figure 28:
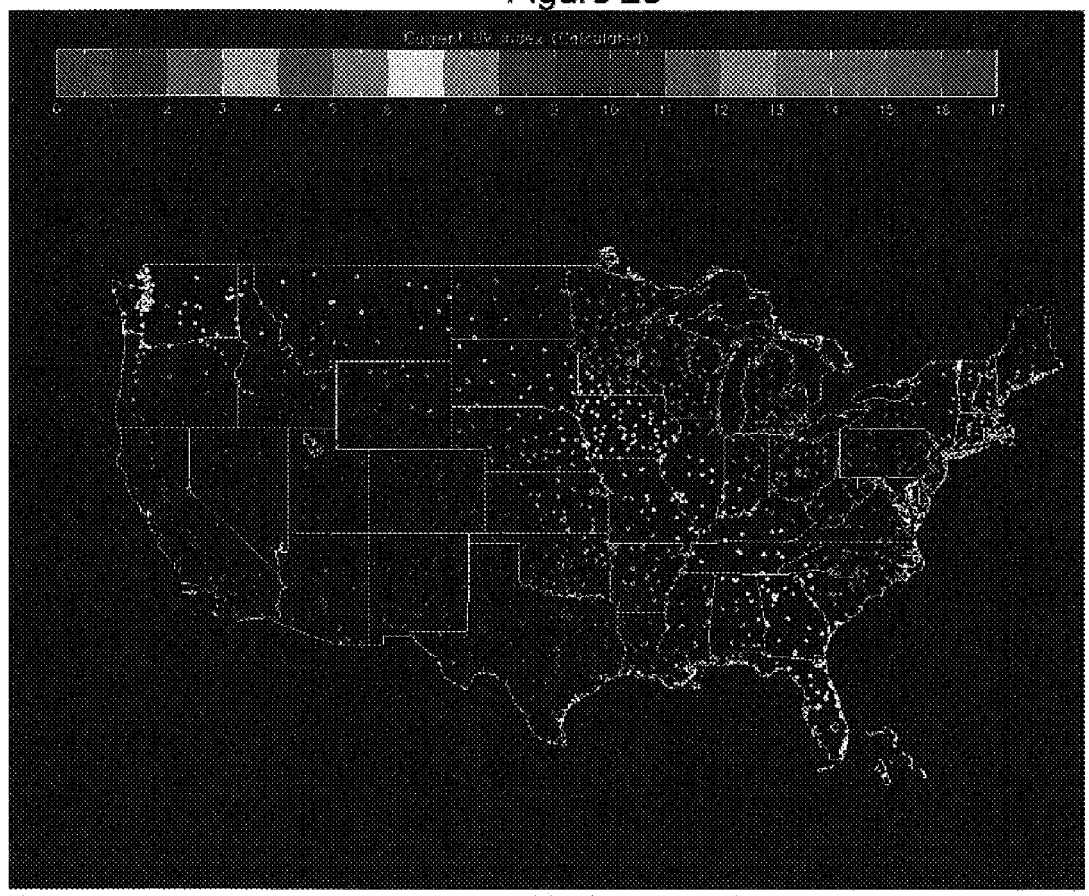
FIG. 28 shows the maximum UV index (calculated with no clouds and METAR only)
Figure 29:
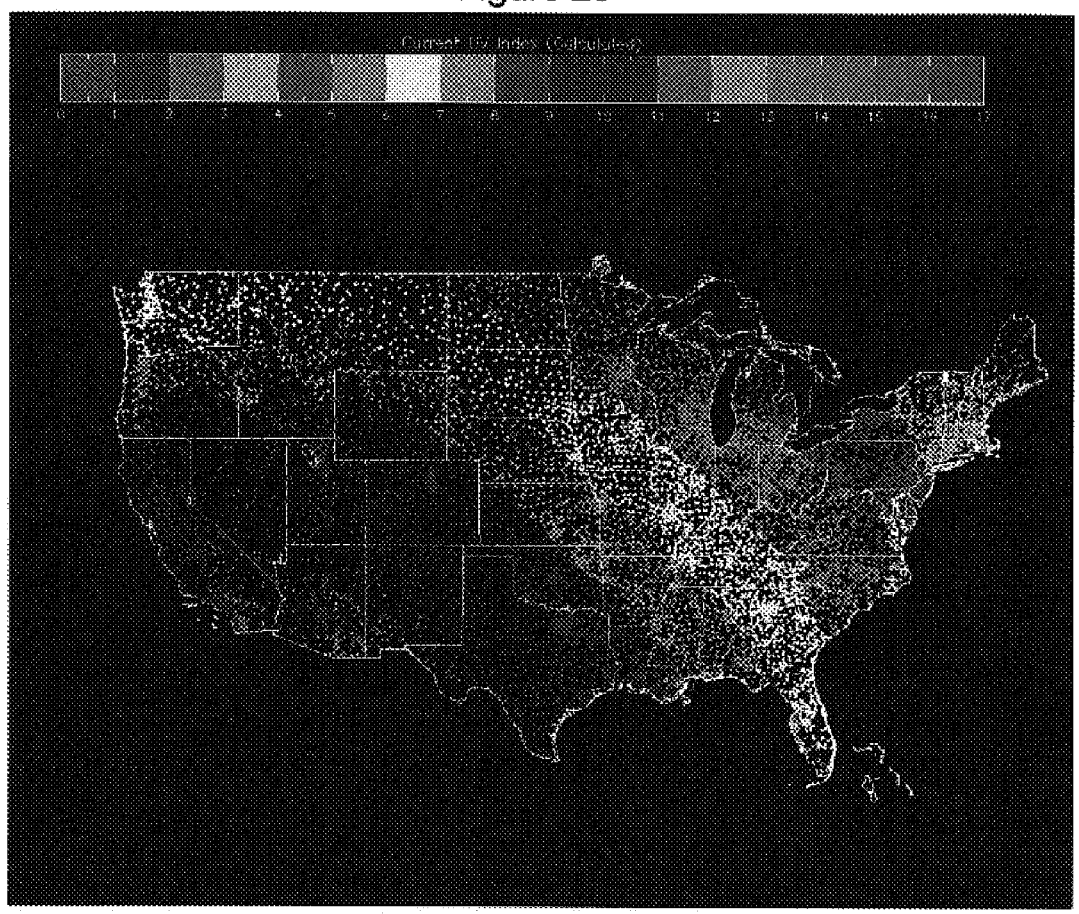
FIG. 29 shows the maximum UV index (calculated with no clouds and GOES augmented)

The clear sky UV index (calculated with no clouds) is shown in FIG. 28 (METAR site list only) and FIG. 29 (GOES augmented site list). Specifically, FIG. 28 shows a simulation of the synthetic UV index for Apr. 28, 2005 (1950Z-1958Z). The calculation corresponds to the maximum clear sky UV index that would have been measured without the presence of clouds. FIG. 29 shows a simulation of the synthetic UV index for Apr. 28, 2005 (1950Z-1958Z). The calculation corresponds to the maximum clear sky UV index that would have been measured without the presence of clouds. The calculation is expanded to approximately 9,500 points.

Figure 30:
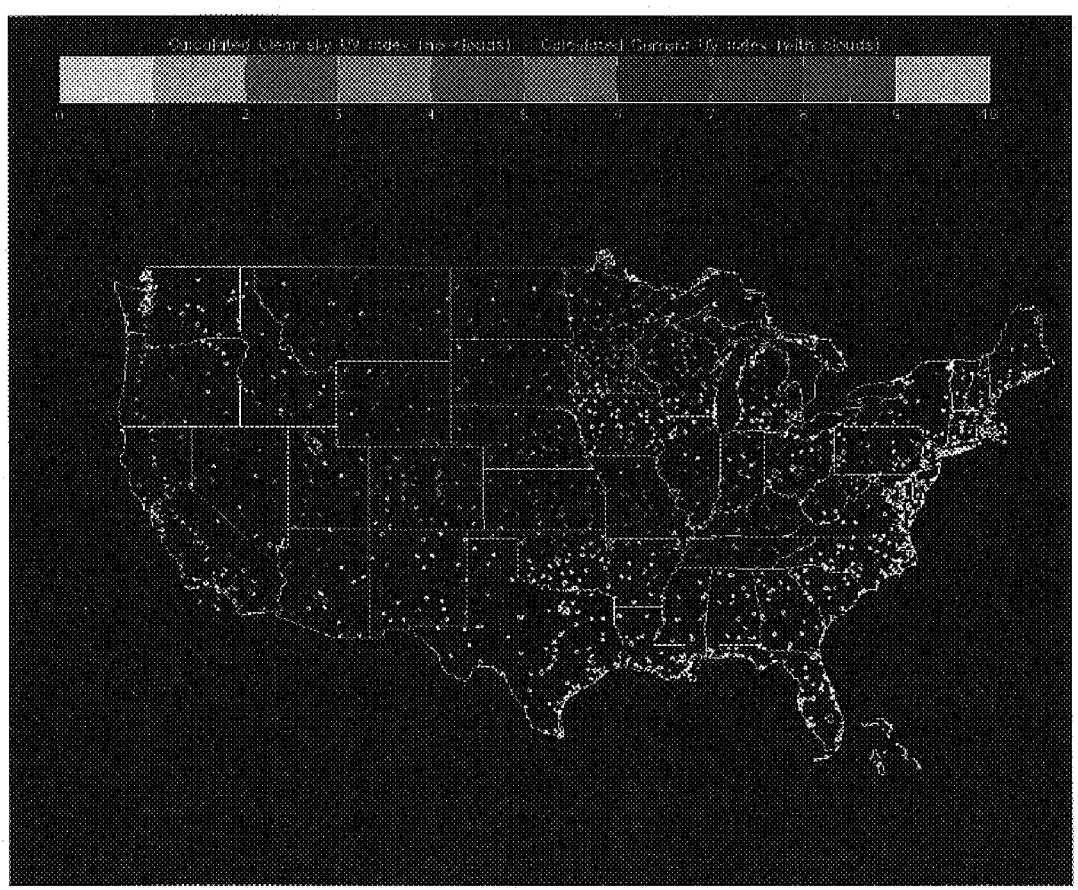
FIG. 30 shows exemplary differences between the clear sky UV index and the UV index calculated for the reported sky conditions (e.g., the UV index reduction due to clouds)
Figure 31:
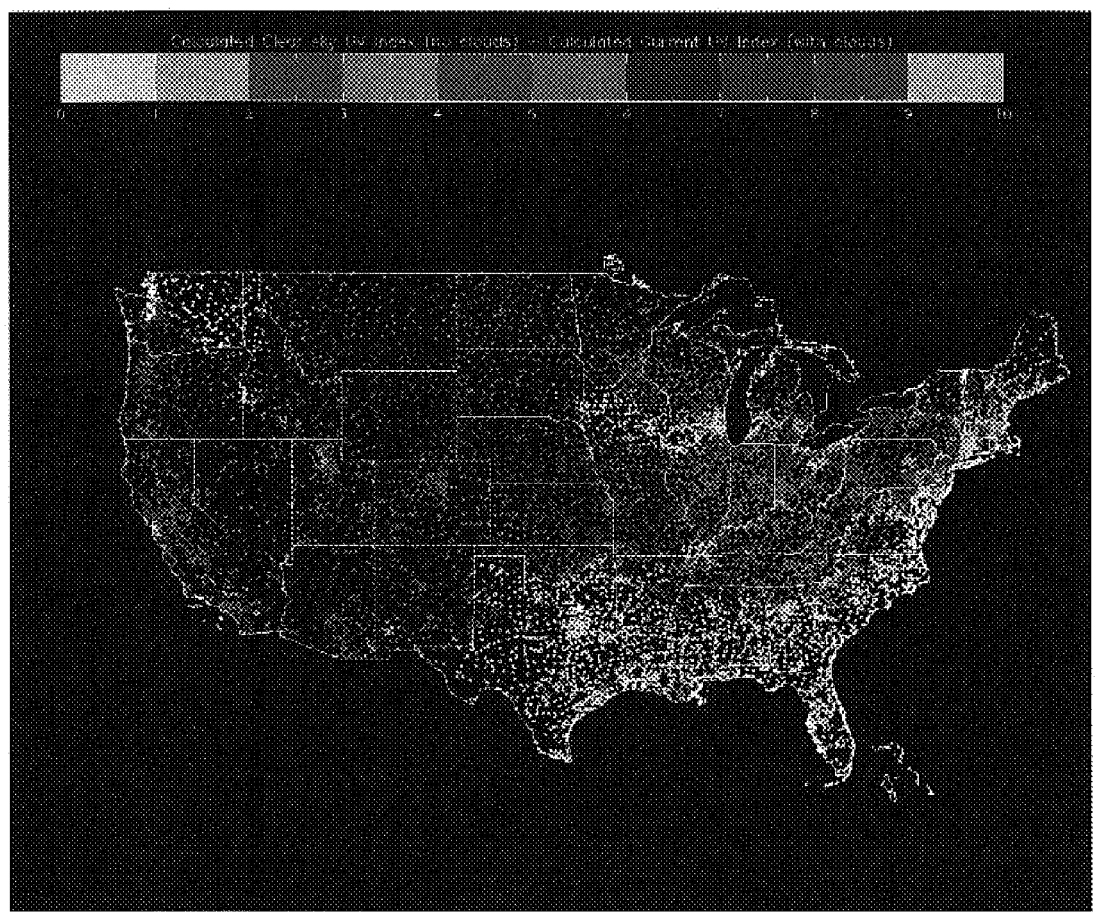
FIG. 31 shows exemplary expanded UV index reduction due to clouds.

The largest differences (6-7 UV index units) between the clear sky UV index and the one calculated for the reported sky conditions are found over northern New Mexico, the northern two thirds of Arizona and from eastern Kansas to California associated with an area of low pressure and precipitation in these states (FIG. 30 and FIG. 31). Specifically, FIG. 30 shows UV index reduction due to clouds (e.g., clear sky UV index—UV index considering clouds) for Apr. 28, 2005 from 1950Z to 1958Z and FIG. 31 shows UV index reduction due to clouds (e.g., clear sky UV index—UV index considering clouds) for Apr. 28, 2005 from 1950Z to 1958Z with the calculation expanded to approximately 9,500 points. The differences are largest for the GOES augmented data, especially over Arizona where more convective clouds triggered thunderstorms. The breaks in clouds over Massachusetts, northern Illinois, or southeastern Minnesota (FIG. 23) or in eastern Washington (FIG. 24) are well captured as yellow or light blue dots in the UV difference map (FIG. 31).

In general, the GOES augmented cloud cover provides more accurate cloud observations in areas where high clouds cannot be detected by ASOS stations. This yields more representative UV index values, especially in areas where opaque altostratus or altocumulus clouds are present. Thin cirrus clouds have a small effect in the attenuation of surface UV radiation and if the sky is not fully covered by these clouds their effects are minimal and transient. The verification results presented above were recalculated to include the effects of GOES enhanced METAR cloud cover for the 13 stations verified between Jul. 25, 2004 and Aug. 25, 2004. The results are almost identical probably due to the fact that a small amount of cases correspond to situations where high level cloud attenuated a considerable portion of the UV radiation during this time period.

Figure 32:
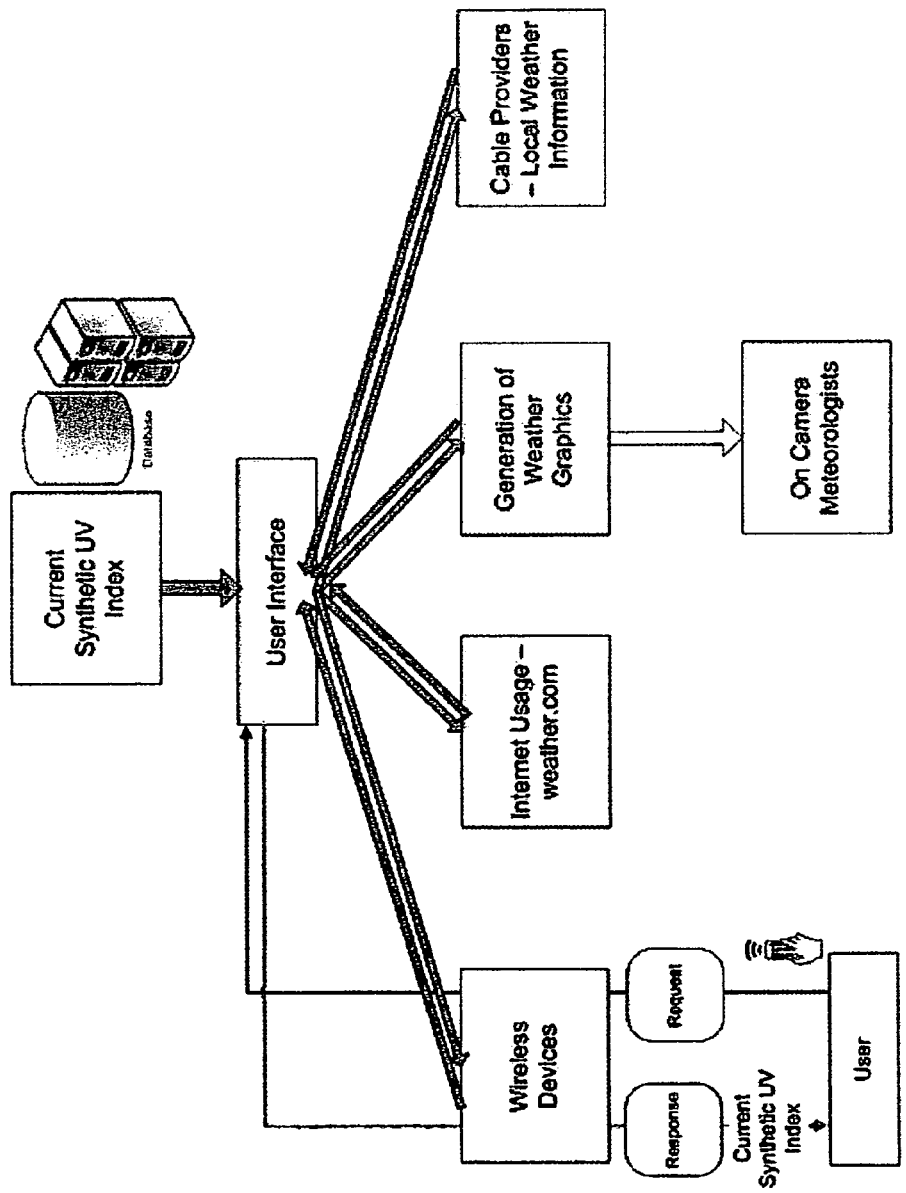
FIG. 32 shows an exemplary system for determining a current synthetic UV index value for a specified location.

FIG. 32 shows a system for providing a current synthetic UV index value for a specified location. As shown in FIG. 32, the system for providing a current synthetic UV index value for a specified location may include an interface for receiving a request for a current synthetic UV index value for a specified location. The request may comprises a geographical location of the specified location, and a date and a time of day of the request. A database may be used to store data comprising a closest cloud cover condition to the specified location and a closest total column ozone available to the specified location. A system server includes an algorithm for determining a current synthetic UV index value for the specified location. Inputs to the algorithm may include the geographical location of the specified location, the date and time of day of the request, the closest cloud cover condition to the specified location, the closest total column ozone available to the specified location, etc. An interface may also be provided for transmitting the determined current synthetic UV index value for the specified location.

CONCLUSIONS

A new current synthetic UV index is calculated which expands by a factor greater than 200 the number of current UV index reports that can be distributed to the public in the United States. Right now, current UV index values are limited to specific UV measuring sites, constrained by the difficulties of maintaining accurate calibration within the network of UV instruments. Reports of cloud cover from surface METAR stations and/or GOES augmented METAR data are used as an input variable in the calculation of the current UV index. The following are the main conclusions.

A verification of this current synthetic UV index is done at 13 USDA UV measuring sites using cloud cover reports from collocated METAR stations. In about 50% of these cases, the current synthetic UV index is substantially identical to the observed UV index. In about 67% of the cases the current synthetic UV index shows a difference of about +/−1 UV index unit from the measured UV index. In about 83% of the cases the current synthetic UV. index is within about +/−2 UV index units of the measured index. These results are compared against the verification results corresponding to tomorrow's UV forecast provided by NOAA (Long et al, 1996). The forecast UV index verification shows that in 32% of the cases the current synthetic UV index is identical to the observed UV index. In 76% of the cases the current synthetic UV index shows a difference of +/−1 UV index unit from the measured UV index. In 92% of the cases the current synthetic UV index is within +/−2 UV index units of the measured index. The differences are probably explained by more errors in the cloud forecasts compared with cloud observations. Uncertainties in the total column ozone forecasts can also account for a smaller portion of the differences.

An empirical relationship may be derived which accounts for the effects of clouds on UV transmission based on surface METAR observations from 13 different locations for a full month. The results of this empirical relationship compare well with other linear empirical relationships derived in other studies (e.g. Ilyas (1987) and Cutchis (1980)). The measured UV index from the exemplary 13 USDA locations may also be verified against the calculated UV index values using the cloud-UV relationships obtained by Ilyas (1987), Cutchis (1980), Josefsson (1986), and Bais et al. (1993). The fact that there is very little difference between the results of the verification of the UV index values calculated using equation 1 and the results obtained using the cloud-UV relationships obtained by Ilyas (1987) and Cutchis (1980) confirms that the average effects of clouds on UV radiation can be represented well using the linear relationship derived in this study.

The current synthetic UV index may be calculated for actual sky conditions for 1200+METAR locations in the continental United States. The results of the current UV index capture well the cloud features that were reported at the time of the simulations. The current synthetic UV index is also calculated using GOES augmented METAR data and compared with the results obtained using METAR-only cloud data. The GOES augmented cloud cover provides a better representation of the current UV index ahead of large scale weather systems with opaque high and mid level clouds as indicated by comparison with satellite images during a case study.

In addition, the current synthetic UV index may be calculated using an algorithm capable of interpolating/spreading cloud cover information from the GOES augmented METAR cloud data to approximately 10,000 locations (or cities) across the United States. The resulting current UV index depicts very well the effect of clouds at a very high resolution. This allows a system to distribute Current Lw index values for about 10,000 cities in the country.

The following references are incorporated herein by reference in their entireties:

Bais, A. F., C. S. Zerefos, C. Meleti, I. C. Ziomas, and C Tourpali, Spectral measurements of solar UVB radiation and its relations to total ozone, SO2, and clouds, J. Geophys. Res., 98, 5199-5208, 1993;

Bigelow, D. S., J. R. Slusser, A. F., Beaubien, and J. H. Gibson, The USDA Ultraviolet Radiation Monitoring Program, Bull. Am. Meteorol. Soc., 79, 601-615, 1998;

Cutchis, P., A formula for comparing annual damaging ultraviolet (DUV) radiation doses at tropical and mid-latitude sites, Federal Aviation Administration Report FAA-EE 80-81, U.S. Department of Transportation, Washington, D.C., 1980;

Ilyas, M., Effect of cloudiness on solar ultraviolet radiation reaching the surface, Atmos. Environ., 21, 1483-1484, 1987;

Josefsson, W., Solar ultraviolet radiation in Sweden, SMHI Report 53, National Institute of Radiation Protection in Stockholm, Norrköping, Sweden, 1986;

Kripke, M., Health effects of UV-B radiation, paper presented at UV-B Monitoring Workshop: A Review of the Science and Status of Measuring and Monitoring Programs, Sponsored by Alternative Fluorocarbons Environmental Acceptability Study and the U.S. Department of Agriculture, Mar. 10 to 12, 1992;

Lemus-Deschamps, L., L. Rikus, and P. Gies, The operational Australian Ultraviolet index forecast 1997, Meteorol. Appl., 6, 241-151, 1999;

Long, C. S., A. J. Miller, H.-T. Lee, J. D. Wild, R. C. Przywarty, and D. Hufford, Ultraviolet index forecasts issued by the National Weather Service, Bull. Amer. Meteorol. Soc., 77, 729-748, 1996;

Peak, M. J., J. G Peak, M. P. Mohering, and R. B. Webb, Ultraviolet action spectra for DNA dimer induction, lethality and mutagenesis in *Escherichia coli* with emphasis on the UV-B region, Photochem. Photobiol., 40, 613-620, 1984;

Sabburg, J., J. E. Rives, R. S. Meltzer, T. Taylor, Zheng Schmalzle, N. Huang, A. Wilson, P. M. Udelhofen, Comparisons of corrected daily-integrated erythemal UVR data from the U.S. EPA/UGA network of Brewer spectroradiometers with model and TOMS-inferred data, J. Geophys. Res. (in press), 2002;

Setlow, R. B., The wavelengths in sunlight effective in producing skin cancer: a theoretical analysis, Proc. Nat. Academ. Sci., 71, 3363-3366, 1974;

Sullivan, J., Effects of UV-B radiation on crops and terrestrial ecosystems, paper presented at UV-B Monitoring Workshop: A Review of the Science and Status of Measuring and Monitoring Programs, Sponsored by Alternative Fluorocarbons Environmental Acceptability Study and the U.S. Department of Agriculture, Mar. 10 to 12, 1992; and Wilson, L. J., Canada's UV Index-How It Is Computed and Disseminated, Environment Canada, Atmospheric Environment Service, 3 pp.

While the present invention has been described in connection with the preferred embodiments of the various Figures, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of determining a current synthetic ultraviolet (UV) index value for a given location, comprising:
   receiving a request for said current synthetic UV index value for said given location, wherein said given location may not be equipped with UV instrumentation;
   determining a closest cloud cover condition and a closest total column ozone available to said given location;
   determining a clear sky UV radiation using a most recent closest total column ozone;
   using said closest cloud cover condition to interpolate a cloud cover condition for said given location;
   determining a cloud adjusted UV radiation using said interpolated cloud cover condition for said given location; and
   converting said cloud adjusted UV radiation to UV index units.

2. The method of claim 1, further comprising determining said clear sky radiation using a location, elevation, and total column ozone at a given time.

3. The method of claim 2, said location comprising a geographical latitude and longitude.

4. The method of claim 1, said adjusting said determining said cloud adjusted UV radiation further comprising using a percentage cloud cover to determine a cloud attenuation factor.

5. The method of claim 1, further comprising multiplying said clear sky UV radiation by a cloud attenuation factor to obtain said cloud adjusted UV radiation.

6. The method of claim 1, further comprising dividing said cloud adjusted UV radiation in milli-Watts m−2 by 25 to convert to said UV index units.

7. The method of claim 1, further comprising providing said UV index to a user device located at said given location.

8. The method of claim 1, interpolating said closest cloud cover condition further comprising:
   determining nearest neighbors to said given location;
   establishing a cloud cover information at each of said nearest neighbors in accordance with climatological data;
   determining corrections to said closest cloud cover condition in accordance with said cloud cover information associated with said nearest neighbors; and
   interpolating said corrections to said given location.

9. The method of claim 1, further comprising:
   interpolating said clear sky UV radiation to determine a clear sky UV radiation for said given location; and
   adjusting said clear sky UV radiation for said given location using cloud cover condition for said given location.

10. The method of claim 1, further comprising augmenting said closest current cloud cover condition using a satellite cloud cover data.

11. A method of determining a current synthetic ultraviolet (UV) index value for a given location, comprising:
    determining a closest cloud cover condition and a closest total column ozone available to said given location;
    interpolating a cloud cover condition for said given location from said closest cloud cover condition;
    interpolating a total column ozone for said given location from said closest total column ozone;
    determining a clear sky UV radiation for said given location using said interpolated total column ozone for said given location;
    determining a cloud adjusted UV radiation using said interpolated cloud cover condition for said given location; and
    converting said cloud adjusted UV radiation to UV index units.

12. The method of claim 11, further comprising forwarding said UV index units to a remote device.

13. The method of claim 11, further comprising verifying said current synthetic UV index value using actual cloud cover reports from specific UV measuring sites.

14. The method of claim 11, wherein said current synthetic UV index value for said given location correlates within an accuracy of about +/−0 UV index units of a direct surface measured UV index value.

15. The method of claim 11, wherein said current synthetic UV index value for said given location correlates within an accuracy of about +/−1 UV index units of a direct surface measured UV index value.

16. The method of claim 11, wherein said current synthetic UV index value for said given location correlates within an accuracy of about +/−2 UV index units of a direct surface measured UV index value.

17. A system for providing a current synthetic UV index value for a specified location, said system comprising:
- a first interface for receiving a request for said current synthetic UV index value for said specified location;
- wherein said request comprises a geographical location of said specified location, and a date and a time of day of said request and wherein said specified location may not be equipped with UV instrumentation;
- a database storing data comprising a closest cloud cover condition to said specified location, and a closest total column ozone available to said specified location;
- a server having an algorithm for determining said current synthetic UV index value for said specified location using said geographical location of said specified location, said date and time of day of said request, said closest cloud cover condition to said specified location, said closest total column ozone available to said specified location, wherein said closest cloud cover condition to said specified location is interpolated to said specified location; and
- a second interface for transmitting said current synthetic UV index value for said specified location.

18. The system of claim 17, wherein said first and second interfaces further comprises one or more of: a wireless network interface, a land-based network interface, an Internet network interface, and/or a satellite network interface.

19. The system of claim 17, wherein said data further comprises a latitude, a longitude, and an altitude for said geographical location.

20. The system of claim 17, wherein said data relating to said closest cloud cover condition to said specified location is periodically updated using measurements to account for diurnal and weather system variations of said closest cloud cover condition to said specified location.

21. The system of claim 17, wherein said current synthetic UV index value for said specified location is transmitted to a user device that generated said request for said current synthetic UV index value for said specified location.

22. The system of claim 17, further comprising a notice regarding current synthetic UV index value for said specified location.

23. The system of claim 17, further comprising a warning regarding potentially harmful effects of the sun's UV rays based on said current synthetic UV index value for said specified location.

24. The system of claim 17, further comprising a recommendation regarding steps to be taken to protect against any harmful effects of the sun's UV rays based on said current synthetic UV index value for said specified location.

25. The system of claim 17, where said first interface and said second interface comprise a single interface.

* * * * *